(12) United States Patent
Yamanouchi

(10) Patent No.: US 10,948,580 B2
(45) Date of Patent: Mar. 16, 2021

(54) OBJECT SENSING DEVICE AND OBJECT SENSING METHOD

(71) Applicant: NEC Corporation, Tokyo (JP)

(72) Inventor: Shingo Yamanouchi, Tokyo (JP)

( * ) Notice: Subject to any disclaimer, the term of this patent is extended or adjusted under 35 U.S.C. 154(b) by 275 days.

(21) Appl. No.: 16/082,354

(22) PCT Filed: Mar. 9, 2017

(86) PCT No.: PCT/JP2017/009392
§ 371 (c)(1),
(2) Date: Sep. 5, 2018

(87) PCT Pub. No.: WO2017/159521
PCT Pub. Date: Sep. 21, 2017

(65) Prior Publication Data
US 2019/0079175 A1    Mar. 14, 2019

(30) Foreign Application Priority Data

Mar. 15, 2016 (JP) ................. 2016-050700

(51) Int. Cl.
*G01S 13/40* (2006.01)
*G01S 13/89* (2006.01)
(Continued)

(52) U.S. Cl.
CPC ............... *G01S 13/40* (2013.01); *G01S 7/02* (2013.01); *G01S 7/4918* (2013.01); *G01S 13/89* (2013.01); *G01S 13/90* (2013.01)

(58) Field of Classification Search
CPC . G01S 13/40; G01S 13/89; G01S 7/02; G01S 7/4918; G01S 13/90
See application file for complete search history.

(56) References Cited

U.S. PATENT DOCUMENTS 8,456,351 B2    6/2013 Kam et al.
9,599,705 B2    3/2017 Wu et al.
(Continued)

FOREIGN PATENT DOCUMENTS

JP      2-162286 A      6/1990
JP   2000-221260 A      8/2000
(Continued)

OTHER PUBLICATIONS

Nobuyoshi Kikuma, "Fundamentals of Array Antennas", MWE2010 Digest, 2010 (11 pages total).
(Continued)

*Primary Examiner* — Timothy X Pham

(57) ABSTRACT

In order to provide an object-sensing device and an object-sending method that are compact and low-cost by realizing an imaging function using fewer antennas than in common systems, an object-sensing device is configured from a transmitter that is provided with a transmission antenna and a receiver that is provided with a reception antenna. The transmitter irradiates an object with electrical waves at various frequencies, and the reception antenna receives an RF signal that is reflected off of the object. The receiver is provided with a phase shifter that individually controls the phase of the RF signal at each frequency, and an adder that adds the RF signals after phase control. The receiver is provided with functionality for detecting the position of the object on the basis of reflected waves from the object by having the phase shifter perform phase adjustment, in order to control the antenna gain of the receiver.

8 Claims, 23 Drawing Sheets

(51) Int. Cl.
*G01S 7/02* (2006.01)
*G01S 13/90* (2006.01)
*G01S 7/4912* (2020.01)

(56) References Cited

U.S. PATENT DOCUMENTS

| | | | |
|---|---|---|---|
| 2007/0023520 A1* | 2/2007 | Miyashita | G01S 13/825 |
| | | | 235/451 |
| 2010/0075618 A1 | 3/2010 | Isaji | |
| 2011/0043403 A1 | 2/2011 | Löffler | |
| 2011/0254727 A1 | 10/2011 | Kam et al. | |
| 2011/0285571 A1* | 11/2011 | Jeong | G01S 7/4026 |
| | | | 342/27 |
| 2012/0256784 A1* | 10/2012 | Nakabayashi | H01Q 21/065 |
| | | | 342/147 |
| 2014/0320335 A1* | 10/2014 | Lee | G01S 13/588 |
| | | | 342/107 |
| 2016/0380355 A1* | 12/2016 | Lysejko | G01S 3/043 |
| | | | 343/853 |

FOREIGN PATENT DOCUMENTS

| | | |
|---|---|---|
| JP | 2005-315811 A | 11/2005 |
| JP | 2010-071865 A | 4/2010 |
| JP | 2010-197138 A | 9/2010 |
| JP | 4653910 B2 | 3/2011 |
| JP | 2011-513721 A | 4/2011 |
| JP | 2012-2797 A | 1/2012 |
| JP | 5080795 B2 | 11/2012 |
| JP | 2013-528788 A | 7/2013 |
| JP | 2015-14611 A | 1/2015 |
| JP | 2015-36682 A | 2/2015 |
| JP | 2015-230216 A | 12/2015 |

OTHER PUBLICATIONS

B. R. Slattery, Ph.D., "Use of Mills cross receiving arrays in radar systems", Proc. IEE, vol. 113, No. 11, Nov. 1966, pp. 1712-1722 (11 pages total).
International Search Report dated Jun. 6, 2017 issued by the International Searching Authority in No. PCT/JP2017/009392.
Written Opinion dated Jun. 6, 2017 issued by the International Bureau in No. PCT/JP2017/009392.

* cited by examiner

OBJECT SENSING DEVICE AND OBJECT SENSING METHOD

This application is a National Stage Entry of PCT/JP2017/009392 filed on Mar. 9, 2017, which claims priority from Japanese Patent Application 2016-050700 filed on Mar. 15, 2016, the contents of all of which are incorporated herein by reference, in their entirety.

TECHNICAL FIELD

The present invention relates to an object sensing device and an object sensing method for recognizing or identifying presence of an object to be detected by irradiating a radio wave to the object to be detected, and detecting a radio wave reflected or irradiated from a target object.

BACKGROUND ART

Unlike light, a radio wave (such as a micro wave, a millimeter wave, and a terahertz wave) has a superior capability of penetrating through an object. A device for imaging and inspecting an article under clothes or within a bag by using a penetration capability of a radio wave, and a remote sensing technique of imaging an earth's surface through clouds from a satellite or an aircraft are put into practice.

Several methods are proposed for an imaging device (object sensing device) employing a radio wave. One of the methods is an array antenna method illustrated in a conceptual diagram of FIG. 19. In the array antenna method, a measuring device is constituted of a transmitter 211 and a receiver 201.

The transmitter 211 includes a transmission antenna 212. Further, the receiver 201 includes reception antennas $202_1$, $202_2$, ..., and $202_N$ (where N is a number of reception antennas).

The transmitter 211 irradiates, from the transmission antenna 212, a radio frequency (RF) signal (radio wave) 213 toward objects to be detected $204_1$, $204_2$, ..., and $204_D$ (where D is a number of objects). The RF signal (radio wave) 213 is reflected on the objects to be detected $204_1$, $204_2$, ..., and $204_D$, and reflected waves $203_1$, $203_2$, ..., and $203_D$ occur. The reflected waves $203_1$, $203_2$, ..., and $203_D$ are received by the reception antennas $202_1$, $202_2$, ..., and $202_N$. The receiver 201 calculates an intensity of a radio wave reflected from the objects to be detected $204_1$, $204_2$, ..., and $204_D$, based on the received reflected waves $203_1$, $203_2$, ..., and $203_D$. By imaging a distribution of intensities of the radio wave, it is possible to acquire an image of the objects to be detected $204_1$, $204_2$, ..., and $204_D$.

Note that, in the array antenna method, as illustrated in FIG. 20, phase shifters $206_1$, $206_2$, ..., and $206_N$ are respectively provided for the reception antennas $202_1$, $202_2$, ..., and $202_N$ in the receiver 201. The phase shifters $206_1$, $206_2$, ..., and $206_N$ respectively apply phase rotation amounts $\Phi_1$, $\Phi_2$, ..., and $\Phi_N$ to incoming waves $208_1$, $208_2$, ..., and $208_N$ received by the reception antennas $202_1$, $202_2$, ..., and $202_N$. The incoming waves $208_1$, $208_2$, ..., and $208_N$ having the phase rotation amounts $\Phi_1$, $\Phi_2$, ..., and $\Phi_N$ applied thereto are added by an adder 207.

Note that the phase shifters $206_1$, $206_2$, ..., and $206_N$, and the adder 207 may be implemented by an analog circuit, or may be implemented by digital processing circuit. In the array antenna method, by setting the phase rotation amounts $\Phi_1$, $\Phi_2$, ..., and $\Phi_N$ by the phase shifters $206_1$, $206_2$, ..., and $206_N$, directivity of an array antenna is controlled. When it is assumed that $g(\theta)$ is directivity of the reception antenna 202, and $a_n$ and $\phi_n$ are respectively an amplitude and a phase of an incoming wave $208_n$ (where n=1, 2, ..., and N) received by a reception antenna $202_n$, directivity $E(\theta)$ of an array antenna is calculated as expressed by the following Eq. (1).

[Eq. 1]

$$E(\theta) = g(\theta) \sum_{n=1}^{N} a_n \exp(j\phi_n)\exp(j\Phi_n) = g(\theta) AF(\theta), \quad (1)$$

Note that, in Eq. (1), a directivity component $AF(\theta)$ acquired by removing directivity $g(\theta)$ of the reception antenna 202 from directivity $E(\theta)$ of an array antenna is referred to as an array factor. The array factor $AF(\theta)$ represents an effect of directivity by forming an array antenna. A signal received by the reception antenna $202_n$ (where n=1, 2, ..., and N) is $g(\theta)a_n\exp(j\phi_n)$. A signal acquired by summing a signal $g(\theta)a_n\exp(j\phi_n)\exp(j\Phi_n)$ which undergoes a phase rotation amount $\Phi_n$ of a phase shifter $206_n$ where n=1, 2, ..., and N by the adder 207 is acquired as directivity $E(\theta)$ in Eq. (1).

When an incident angle of the incoming waves $208_1$, $208_2$, ..., and $208_N$ is $\theta$, the phase $\phi_n$ of the incoming wave $208_n$ is given by $-2\pi \cdot n \cdot d \cdot \sin\theta/\lambda$ (where n=1, 2, ..., and N). Note that, herein, d is an interval of the reception antenna $202_n$ (where n=1, 2, ..., and N), and $\lambda$ is a wavelength of the incoming waves $208_1$, $208_2$, ..., and $208_N$. In Eq. (1), when it is assumed that the amplitude an is constant irrespective of n, and when a relationship between the phase rotation amount $\Phi_n$ of the phase shifter $206_n$ (where n=1, 2, ..., and N), and the phase $\phi_n$ of the incoming wave $208_n$ is set to satisfy: $\Phi_n = -\phi_n$, the array factor $AF(\theta)$ becomes maximum in a direction of the angle $\theta$. Specifically, by setting the phase rotation amount $\Phi_n$ in such a way that a phase becomes opposite to the phase $\phi_n$ of the incoming wave $208_n$, it is possible to align directivity of an array antenna with an incoming wave.

An example of a radio wave imaging device by an array antenna method is disclosed in PTLs 1 to 3.

In the array antenna method described in PTLs 1 and 2, directivity of a receiving array antenna constituted of the reception antennas $202_1$, $202_2$, ... and $202_N$ is controlled by a phase shifter (not illustrated) incorporated in the receiver 201 and connected to the reception antennas $202_1$, $202_2$, ..., and $202_N$. By changing directivity of a receiving array antenna ($202_1$, $202_2$, ..., and $202_n$) formed in a beam shape, and directing a directive beam of the receiving array antenna ($202_1$, $202_2$, ..., and $202_N$) to each of the objects to be detected $204_1$, $204_2$, ..., and $204_D$, an intensity of a radio wave reflected from the objects to be detected $204_1$, $204_2$, ..., and $204_D$ is calculated.

In PTL 3, directivity of a receiving array antenna ($202_1$, $202_2$, ..., and $202_N$) is controlled by using frequency dependency of the receiving array antenna ($202_1$, $202_2$, ..., and $202_N$). A point that an intensity of a radio wave reflected from the objects to be detected $204_1$, $204_2$, ..., and $204_D$ is calculated by directing a directive beam of the receiving array antenna ($202_1$, $202_2$, ..., and $202_N$) to each of the objects to be detected $204_1$, $204_2$, ..., and $204_D$ is common with PTLs 1 and 2.

As another method for an imaging device employing a radio wave, there is a synthetic aperture radar (SAR) method illustrated in a conceptual diagram of FIG. 21.

In a synthetic aperture radar method, a measuring device is constituted of a transmitter 311 and a receiver 301.

The transmitter 311 includes a transmission antenna 312. Further, the receiver 301 includes a reception antenna 302.

The transmitter 311 irradiates an RF signal (radio wave) 313 from the transmission antenna 312 toward objects to be detected $304_1$, $304_2$, . . . , and $304_D$ (where D is a number of target objects). The RF signal (radio wave) 313 is reflected on the objects to be detected $304_1$, $304_2$, . . . , and $304_D$, and reflected waves $303_1$, $303_2$, . . . , and $303_D$ are respectively generated. At this occasion, the receiver 301 receives the reflected waves $303_1$, $303_2$, . . . , and $303_D$ at (positions of) reception antennas $302_1$, $302_2$, . . . , and $302_N$, while moving to positions of receivers $301_1$, $301_2$, . . . , and $301_N$. At this occasion, the reception antennas $302_1$, $302_2$, . . . , and $302_N$ constitute a receiving array antenna (virtual array antenna) constituted by N antennas, similarly to the reception antennas $202_1$, $202_2$, . . . , and $202_N$ by the array antenna method illustrated in FIG. 19. Therefore, similarly to the array antenna method illustrated in FIG. 19, also in the synthetic aperture radar method illustrated in FIG. 21, the receiver 301 is able to calculate intensities of a radio wave reflected from the objects to be detected $304_1$, $304_2$, . . . , and $304_D$, based on the received reflected waves $303_1$, $303_2$, . . . , and $303_D$, and acquire an image of the objects to be detected $304_1$, $304_2$, . . . , and $304_D$ by imaging a distribution of the intensities of the radio wave.

Examples of a radio wave imaging device by a synthetic aperture radar method are disclosed in PTLs 4 to 6.

CITATION LIST

Patent Literature

[PTL 1] Japanese Translation of PCT International Application Publication No. JP-T-2013-528788
[PTL 2] Japanese Unexamined Patent Application Publication No. 2015-014611
[PTL 3] Japanese Patent No. 5080795
[PTL 4] Japanese Patent No. 4653910
[PTL 5] Japanese Translation of PCT International Application Publication No. JP-T-2011-513721
[PTL 6] Japanese Unexamined Patent Application Publication No. 2015-036682

Non Patent Literature

[NPL 1] Nobuyoshi KIKUMA, "Fundamentals of Array Antennas", MWE2010 Digest, (2010)
[NPL 2] B. R. Slattery, "Use of Mills cross receiving arrays in radar systems", PROC. IEE, Vol. 113, No. 11, NOVEMBER 1966, pp. 1712-1722.

SUMMARY OF INVENTION

Technical Problem

First of all, a problem of an array antenna method described in FIG. 19, or PTLs 1 to 3 is discussed. A problem of the array antenna method is that a number N of required reception antennas $202_1$, $202_2$, . . . , and $202_N$, and receivers accompanied thereby increases, and consequently, a cost, a size, and a weight of a device also increase.

The above-described point is described specifically. In a case of an array antenna method, an interval between respective antennas of the reception antennas $202_1$, $202_2$, . . . , and $202_N$ is required to be equal to or smaller than half of a wavelength λ of the reflected waves $203_1$, $203_2$, . . . , and $203_N$ to be received by the receiver 201. When the above-described condition is not satisfied, there occurs a problem that, in a generated image, a virtual image is generated at a position where the objects to be detected $204_1$, $204_2$, . . . , and $204_D$ are not present. When the reflected waves $203_1$, $203_2$, . . . , and $203_D$ are millimeter waves, a wavelength thereof is about several millimeters.

Further, image resolution is determined by a width Δθ of a directive beam of a receiving array antenna ($202_1$, $202_2$, . . . , and $202_N$). The width Δθ of a directive beam of a receiving array antenna ($202_1$, $202_2$, . . . , and $202_N$) is given by Δθ~λ/D. Herein, D is an aperture size of a receiving array antenna ($202_1$, $202_2$, . . . , and $202_N$), and is associated with a distance between the reception antennas $202_1$ and $202_N$ present at both ends. In order to acquire practical resolution in imaging an article under clothes or within a bag, it is required to set the aperture size D of a receiving array antenna ($202_1$, $202_2$, . . . , and $202_N$) from about several ten centimeters to about several meters.

In view of the above-described condition, specifically, in view of two points that an interval between respective antennas of the reception antennas $202_1$, $202_2$, . . . , and $202_N$ is required to be equal to or smaller than half of the wavelength λ (equal to or smaller than several millimeters), and a distance between the reception antennas $202_1$ and $202_N$ present at both ends is required to be at least about several centimeters, a number N of required antennas per row becomes about several hundreds. Further, in view of that an actual radio wave imaging device is required to capture a two-dimensional image, as illustrated in FIG. 22, it is required to dispose N reception antennas 9202 each in a vertical direction and in a horizontal direction. Then, a total number of required antennas becomes $N^2$. Therefore, a total number of required antennas and receivers accompanied thereby becomes about several ten thousands. In this way, since a large number of antennas and receivers are required, a cost becomes extremely high. Further, since antennas are disposed in an area of several ten centimeters to several meters square, a size and a weight of a device become extremely large.

Alternatively, as a method for acquiring a two-dimensional image, a Mills cross method described in NPL 2 and FIG. 23 is known. This is a method for acquiring a two-dimensional image by using two one-dimensional array antennas 9201 disposed in a vertical direction and in a horizontal direction, and generating a product of signals of the two array antennas 9201 by a multiplier 221. Even in this case, however, the number of required antennas 9202 is 2N, and about several hundreds of antennas 9202 are still required. Therefore, a problem on a cost, and a size and a weight of a device is not solved.

Next, a problem on a synthetic aperture radar method described in FIG. 21, or PTLs 4 to 6 is discussed. A problem on the synthetic aperture radar method is that it is required to mechanically move a device, and therefore it is difficult to shorten scanning time. This leads to a problem that the number of inspectable target objects per unit time is limited, when an article or a person are inspected by a radio wave imaging device. Further, in a radio wave imaging device described in PTL 6, a mechanical mechanism for moving a receiver is required. This leads to an increase in size and weight of a device.

As discussed above, in a general radio wave imaging device, a cost, a size, and a weight of a device become extremely large. Therefore, there is a problem that applications and chances with which the device is actually usable are limited. Further, there is a problem that a speed at which a target object is inspected is also limited. An object of the present invention is to provide a technique for solving these problems.

Solution to Problem

An aspect of the present invention is an object sensing device constituted of a transmitter including a transmission antenna, and a receiver including a reception antenna, wherein a radio wave of a plurality of frequencies is irradiated from the transmission antenna toward a target object, the receiver receives the radio wave of a plurality of frequencies reflected from the target object, the receiver has a phase adjusting function of respectively adjusting phases with respect to the received radio wave of respective frequencies, the receiver controls directivity of antenna gain by the phase adjusting function, and the receiver detects a position or a shape of the target object by measuring an intensity distribution of a radio wave incoming to the receiver by directivity control of the antenna gain.

Further, an aspect of the present invention is an object sensing method employing a transmitter including a transmission antenna, and a receiver including a reception antenna, wherein the object sensing method includes: irradiating a radio wave of a plurality of frequencies toward a target object by using the transmission antenna; receiving the radio wave of a plurality of frequencies reflected from the target object by using the receiver; adjusting phases respectively with respect to the received radio wave of respective frequencies by the receiver; controlling directivity of antenna gain of the receiver by the phase adjustment; and detecting a position or a shape of the target object by measuring an intensity distribution of a radio wave incoming to the receiver by directivity control of the antenna gain of the receiver.

Advantageous Effects of Invention

In an object sensing device and an object sensing method according to the present invention, it is possible to increase the number of virtual antennas by increasing the number of frequencies of a received radio wave (RF signal), in place of increasing the number of actual antennas in a receiver. Consequently, in the present invention, it is possible to remarkably reduce the number of antennas, as compared with a general array antenna method.

When compared to the present invention, in the synthetic aperture radar method, it is required to mechanically move a receiver. This leads to a problem that time for detecting or inspecting an object increases. On the other hand, in the present invention, since not a position of a receiver but a receiving frequency is electronically scanned, it is possible to shorten time for detecting or inspecting an object, as compared with the synthetic aperture radar method.

Specifically, in the object sensing device and the object sensing method according to the present invention, since it is possible to reduce the number of required antennas and receivers accompanied thereby, as compared with a general array antenna method, an advantageous effect that it is possible to reduce a cost, a size, and a weight of a device is provided. Further, in the above-described object sensing device and object sensing method, unlike a general synthetic aperture radar method, since it is not required to mechanically move a device, an advantageous effect that it is possible to shorten time for detecting and inspecting an object is provided.

EXAMPLE EMBODIMENT

In the following, preferred example embodiments of a transmitting device and a transmitting method according to the present invention are described with reference to the accompanying drawings. Note that, in respective drawings illustrated hereinafter, it is assumed that elements identical or equivalent are indicated with the same reference numbers, and description thereof is not repeated.

(Summary of Present Invention)

A summary of the present invention is described first of all, prior to description on example embodiments of the present invention.

The present invention is directed to an object sensing device and an object sensing method for generating an image of an object to be detected by irradiating a radio wave of a plurality of RF frequencies to the object to be detected, and detecting a radio wave to be reflected or irradiated from a target object, and main features of the present invention are reducing the number of required antennas and receiving units, as compared with a general configuration, and implementing image generation by high-speed scanning without the need of moving.

Specifically, an object sensing device according to the present invention is an object sensing device constituted by a transmitter including a transmission antenna, and a receiver including a reception antenna. A radio wave of a plurality of frequencies is irradiated from the transmission antenna toward a target object. The receiver receives the radio wave of a plurality of frequencies reflected from the target object. The receiver has a function of adjusting phases with respect to the received radio wave of respective frequencies. The receiver controls directivity of antenna gain by the phase adjusting function, and the receiver detects a position or a shape of the target object by measuring an intensity distribution of a radio wave incoming to the receiver by directivity control of the antenna gain.

Specifically, in the above-described object sensing device and object sensing method, since it is possible to reduce the number of required antennas and receivers accompanied thereby, as compared with a general array antenna method, an advantageous effect that it is possible to reduce a cost, a size, and a weight of a device is provided. Further, in the above-described object sensing device and object sensing method, unlike a general synthetic aperture radar method, since it is not required to mechanically move a device, an advantageous effect that it is possible to shorten time for detecting or inspecting an object is provided.

First Example Embodiment

Figure 1:
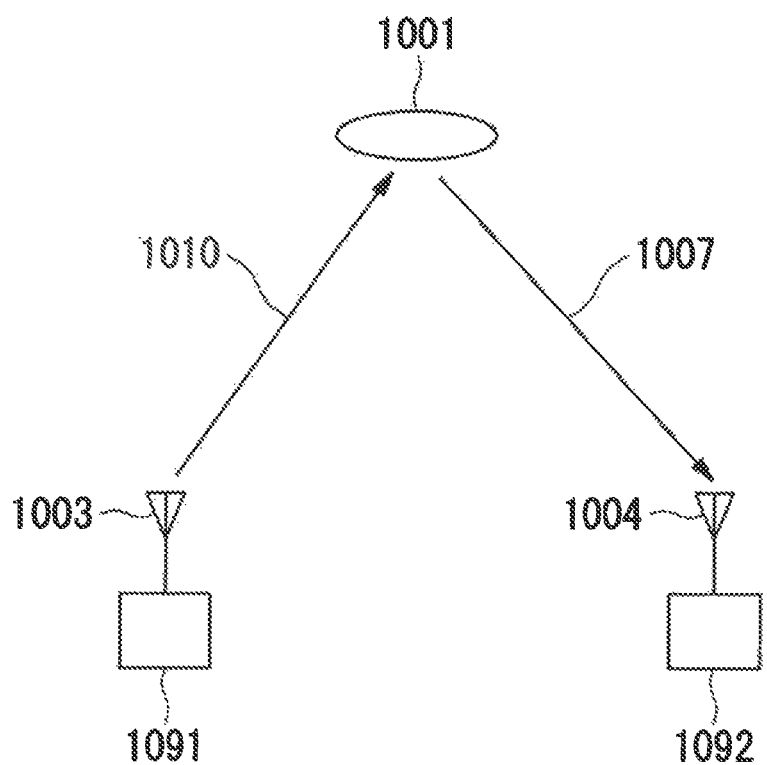
FIG. 1 is a configuration diagram illustrating a configuration of an object sensing device in a first example embodiment according to the present invention.

FIG. 1 is a configuration diagram illustrating a configuration of a first example embodiment according to the present invention. As illustrated in FIG. 1, the first example embodiment of the present invention is constituted by a transmitter 1091 and a receiver 1092. The transmitter 1091 includes a transmission antenna 1003. The receiver 1092 includes a reception antenna 1004. Although FIG. 1 illustrates one receiver 1092, a plurality of receivers 1092 may be provided, and also a plurality of reception antennas 1004 may be provided.

In the first example embodiment, the transmitter 1091 irradiates, from the transmission antenna 1003, a radio wave 1010 of a plurality of (M) RF frequencies (carrier frequencies $f_1, f_2, \ldots,$ and $f_M$) to a target object 1001. In the present example embodiment, the radio wave 1010 of a plurality of RF frequencies may be transmitted by switching the RF frequencies of the radio wave 1010 to be transmitted depending on a time. Alternatively, the radio wave 1010 of a plurality of RF frequencies may be simultaneously transmitted. The transmitted radio wave 1010 is reflected on the target object 1001, and a reflected wave 1007 generated thereby is received by the receiver 1092.

Operation principles of the first example embodiment are described with reference to FIG. 2. Specifically, in the present example embodiment, it is interpreted that measurement at the carrier frequencies $f_1, f_2, \ldots,$ and $f_M$ is respectively performed by virtual transmission antennas $1003(f_1), 1003(f_2), \ldots,$ and $1003(f_M)$, and virtual reception antennas $1004(f_1), 1004(f_2), \ldots,$ and $1004(f_M)$. Further, the reflected wave 1007 (and complex amplitudes thereof) received by the virtual reception antennas $1004(f_1), 1004(f_2), \ldots,$ and $1004(f_M)$ is added by an adder 1032, after undergoing phase rotation amounts $\Phi_1, \Phi_2, \ldots$ and $\Phi_M$ by phase shifters $1031(f_1), 1031(f_2), \ldots,$ and $1031(f_M)$. Note that, in the present example embodiment, it is assumed that phase rotation amounts by the phase shifters $1031(f_1), 1031(f_2), \ldots,$ and $1031(f_M)$ and addition by the adder 1032 are implemented by digital processing.

Figure 20:
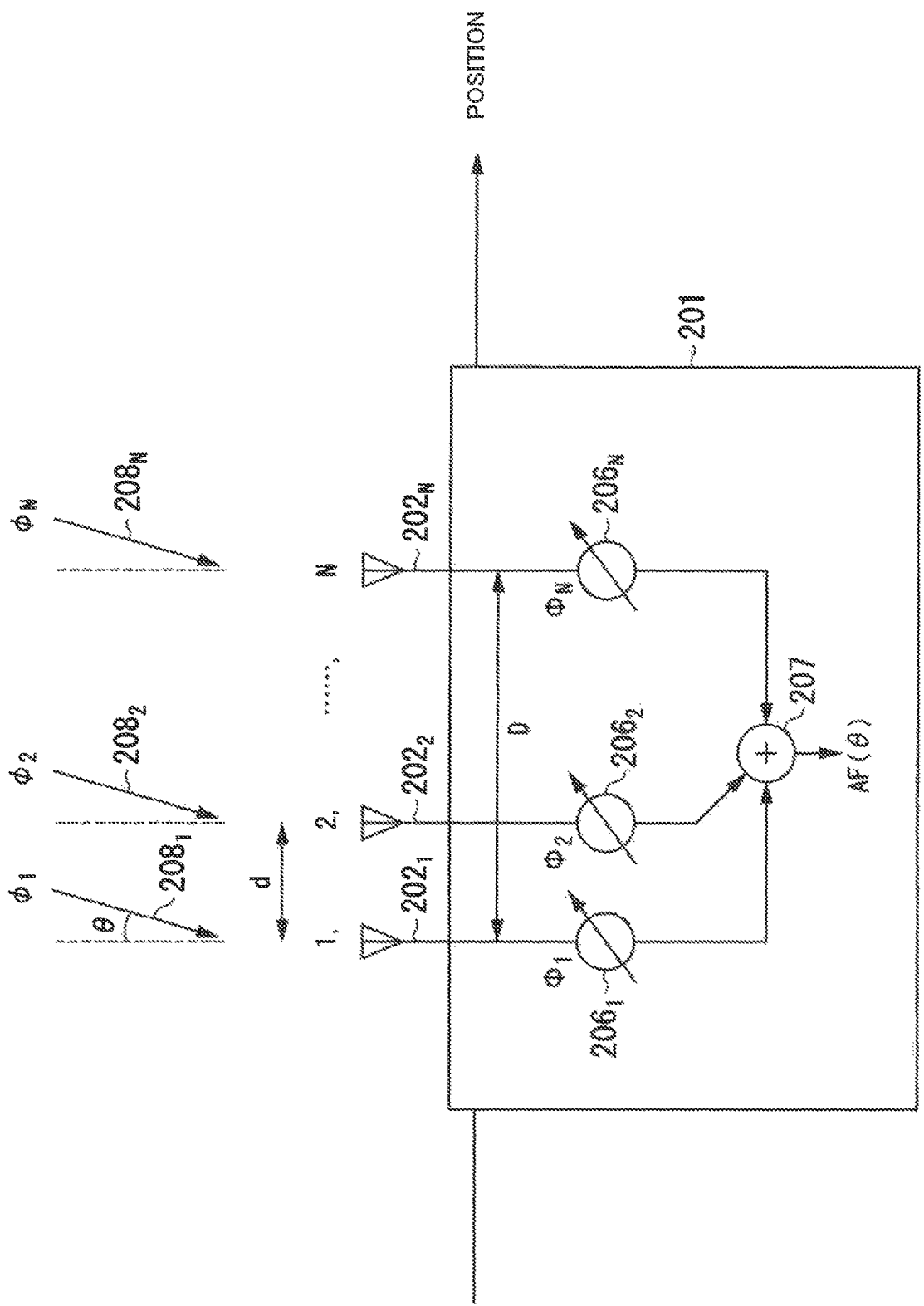
FIG. 20 is a configuration diagram illustrating a configuration of an array antenna method in a general technique.
Figure 21:
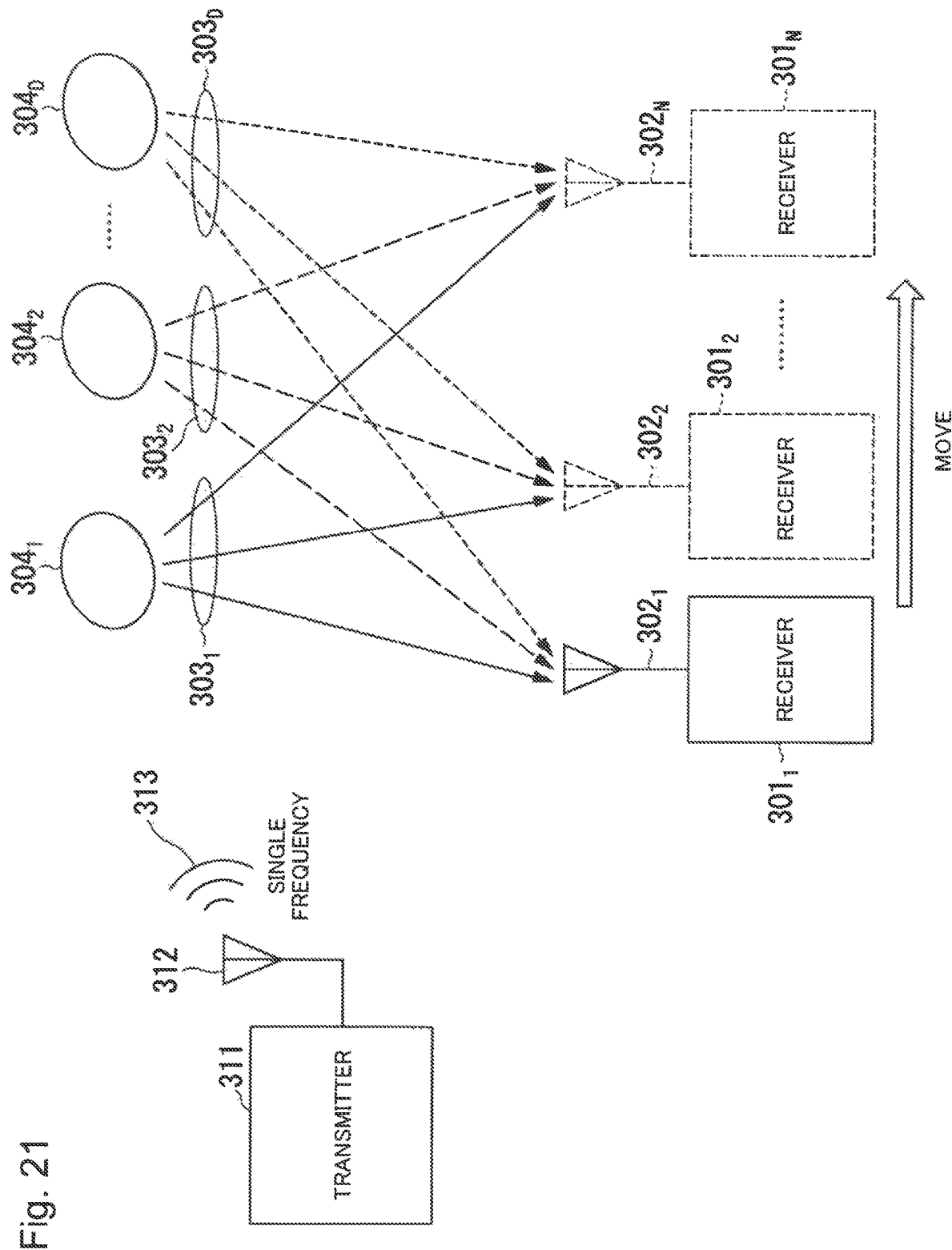
FIG. 21 is a conceptual diagram illustrating a concept on a synthetic aperture radar method in a general technique.
Figure 22:
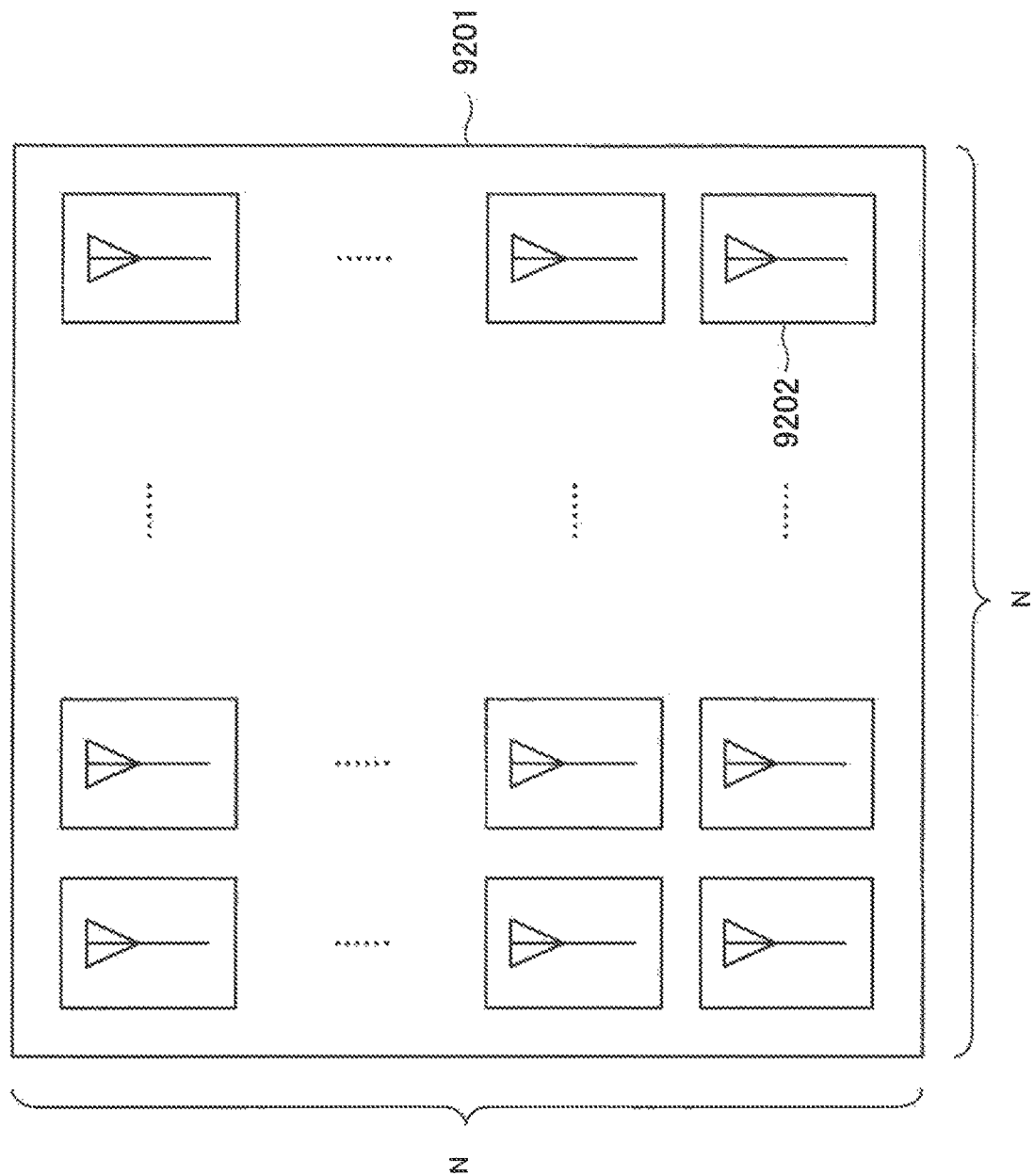
FIG. 22 is a configuration diagram illustrating a configuration of an array antenna method in a general technique.

As described above, principles of the present example embodiment are regarded as configuring a virtual array antenna by measurement data at the carrier frequencies $f_1, f_2, \ldots,$ and $f_M$. Also in a virtual array illustrated in FIG. 2, it is possible to calculate an array factor $AF(x_d)$ similarly to a general array antenna illustrated in FIG. 20. Herein, it is assumed that a position of the transmitter 1091 is (0, 0), a position of the receiver 1092 is $(x_r, 0)$, and a position of the target object 1001 is $(x_d, z)$ by using position coordinates by an x-axis and a z-axis. When it is assumed that an amplitude and a phase of a reflected wave $1007(f_m)$ received by a virtual reception antenna $1004(f_m)$ (where m=1, 2, . . . , and M) are respectively $a_m$, and $\phi_m$, the array factor $AF(x_d)$ of a virtual array in the present example embodiment is calculated as expressed by the following Eq. (2).

[Eq. 2]

$$AF(x_d) = \sum_{m=1}^{M} a_m \exp(j\phi_m)\exp(j\Phi_m), \quad (2)$$

Further, a phase $\phi_m$ (where m=1, 2, . . . , and M) of the reflected wave $1007(f_m)$ is given by the following Eq. (3).

[Eq. 3]

$$\phi_m = -2\pi(m-1)\Delta f[L_t(x_d)+L_r(x_d)]/c, \quad (3)$$

Herein, $\Delta f$ is an interval of the carrier frequencies $f_1, f_2, \ldots,$ and $f_M$ for use in measurement, $L_t(x_d)$ is a distance between the transmitter 1091 and the target object 1001, and $L_r(x_d)$ is a distance between the receiver 1092 and the target object 1001. c is a speed of light. In Eq. (3), when it is assumed that the amplitude $a_m$ is constant irrespective of m, and when a relationship between a phase rotation amount $\Phi_m$ (where m=1, 2, . . . , and M) of a phase shifter 1031($f_m$), and the phase $\phi_m$ of the reflected wave 1007($f_m$) is set to satisfy: $\Phi_m=-\phi_m$, the array factor AF($x_d$) becomes maximum in a direction of the target object 1001 (position $x_d$). These procedures are associated with aligning directivity of a virtual array with a direction of a reflected wave.

Figure 3:
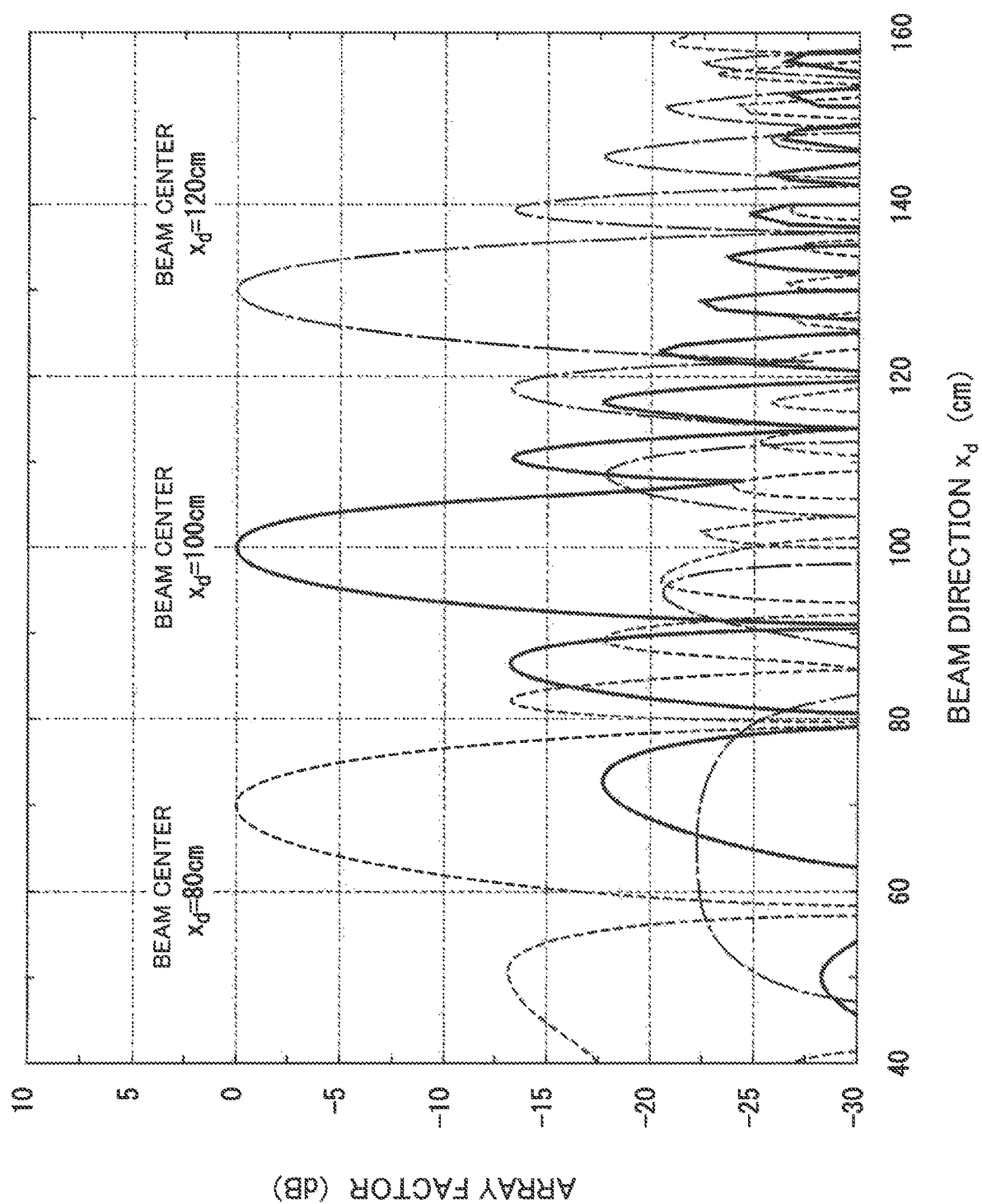
FIG. 3 is a characteristic diagram illustrating an example of directivity of antenna gain of the object sensing device in the first example embodiment according to the present invention.

FIG. 3 illustrates a calculation result of the array factor AF($x_d$) of a virtual array in the present example embodiment by Eq. (2) and Eq. (3). FIG. 3 illustrates a an array factor (specifically, a beam pattern) of a virtual array, when the phase rotation amount $\Phi_n$, (where m=1, 2, . . . , and M) of the phase shifter 1031($f_m$) is set in such a way that a beam center of the virtual array is directed in a direction where $x_d$=80 cm, 100 cm, and 120 cm with respect to the position ($x_d$, z) of the target object 1001. When calculation is performed, it is assumed that a frequency interval $\Delta f$=250 MHz, a number of frequencies: M=21, a z-axis coordinate position of a target object: z=100 cm, and a distance between a transmitter and a receiver: $x_r$=100 cm. As illustrated in FIG. 3, also in a virtual array of the present example embodiment, it is possible to control directivity (beam pattern) of a virtual array by the phase rotation amount $\Phi_m$ (where m=1, 2, . . . , and M) of the phase shifter 1031($f_m$).

It is possible to calculate a beam width of a beam pattern from the array factor AF($x_d$) given by Eqs. (2) and (3). A beam width is a factor that estimates an incoming direction or determines imaging (image) resolution. A beam width $\Delta x$ in the present example embodiment is given by the following equation.

[Eq. 4]

$$\Delta x = \frac{c}{BW} h(x_r, x_d, z), \quad (4)$$

In Eq. (4), BW is a bandwidth to be used (BW=$\Delta f \times$(M−1) with respect to a frequency interval $\Delta f$ and a number M of frequencies), and h($x_r$, $x_d$, z) is a function of a position variable ($x_r$, $x_d$, z). Note that, when $x_r=x_d$, h($x_r$, $x_d$, z) is given by $[1+(z/x_r)2]^{1/2}$. As expressed by Eq. (4), in a virtual array of the present example embodiment, as the bandwidth BW is widened, the beam width $\Delta x$ is shortened, and further enhanced resolution performance is acquired.

Also in a virtual array of the present example embodiment, a virtual image by a grating lobe may be generated similarly to a general array antenna. The following phase amount $\phi(x_a)$ is defined.

[Eq. 5]

$$\phi(x_a)=-2\pi\Delta f[L_t(x_a)+L_r(x_a)-L_t(x_d)-L_r(x_d)]/c, \quad (5)$$

Figure 4:
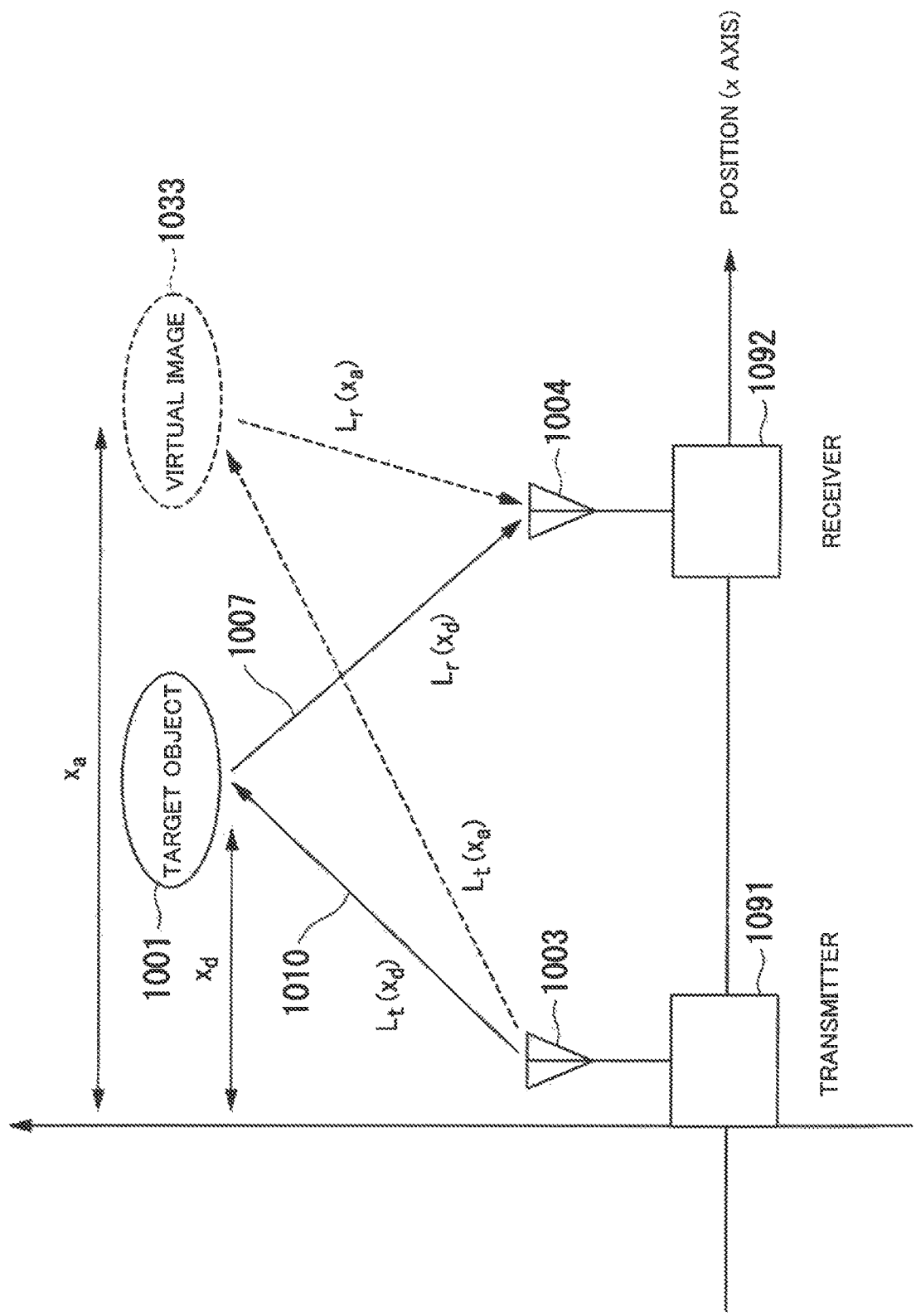
FIG. 4 is a diagram illustrating a configuration and principles of the object sensing device and the object sensing method in the first example embodiment according to the present invention.

In FIG. 4, the phase amount $\phi(x_a)$ in Eq. (5) is associated with a difference between a phase shift of a radio wave at a carrier frequency $f_{m+1}$ from the transmitter 1091 to the receiver 1092 via a virtual image 1033 (position $x_a$), and a phase shift of a radio wave at a carrier frequency $f_m$ from the transmitter 1091 to the receiver 1092 via the target object 1001 (position $x_d$). When $\phi(x_a)$ becomes an integer multiple of $2\pi$ at a position $x_a$, the same array factor is acquired at the position $x_a$ and at the position $x_d$ of a target object. Specifically, even when a target object is not actually present at the position xa, an image (specifically, the virtual image 1033) of the target object 1001 is generated at the position $x_a$. Therefore, it is possible to employ an area that satisfies $|\phi(x)|<\pi$, specifically, a range of a position x that satisfies the following conditional expression (6), as an area (visible area) free from generation of a virtual image.

[Eq. 6]

$$|L_t(x)+L_r(x)-L_t(x_d)-L_r(x_d)| < \frac{c}{2\Delta f}, \quad (6)$$

From Eq. (6), it is clear that a visible area increases, as the frequency interval $\Delta f$ is reduced. A size (length) of a visible area is generally inversely proportional to the frequency interval $\Delta f$.

When an incoming direction of a reflected wave is estimated by using a virtual array of the present example embodiment, and imaging processing (image generation) is performed from the estimation result, the number of pixels per direction is given by a ratio between a visible area and resolution. From a result expressed by Eq. (4) and Eq. (6), a relationship that the number of pixels per direction=visible area/resolution∝BW/$\Delta f$=M is acquired (where BW is a bandwidth, $\Delta f$ is a frequency interval, and M is a number of frequencies). Specifically, in the present example embodiment, a number M of frequencies may be set depending on a required number of pixels.

Figure 5:
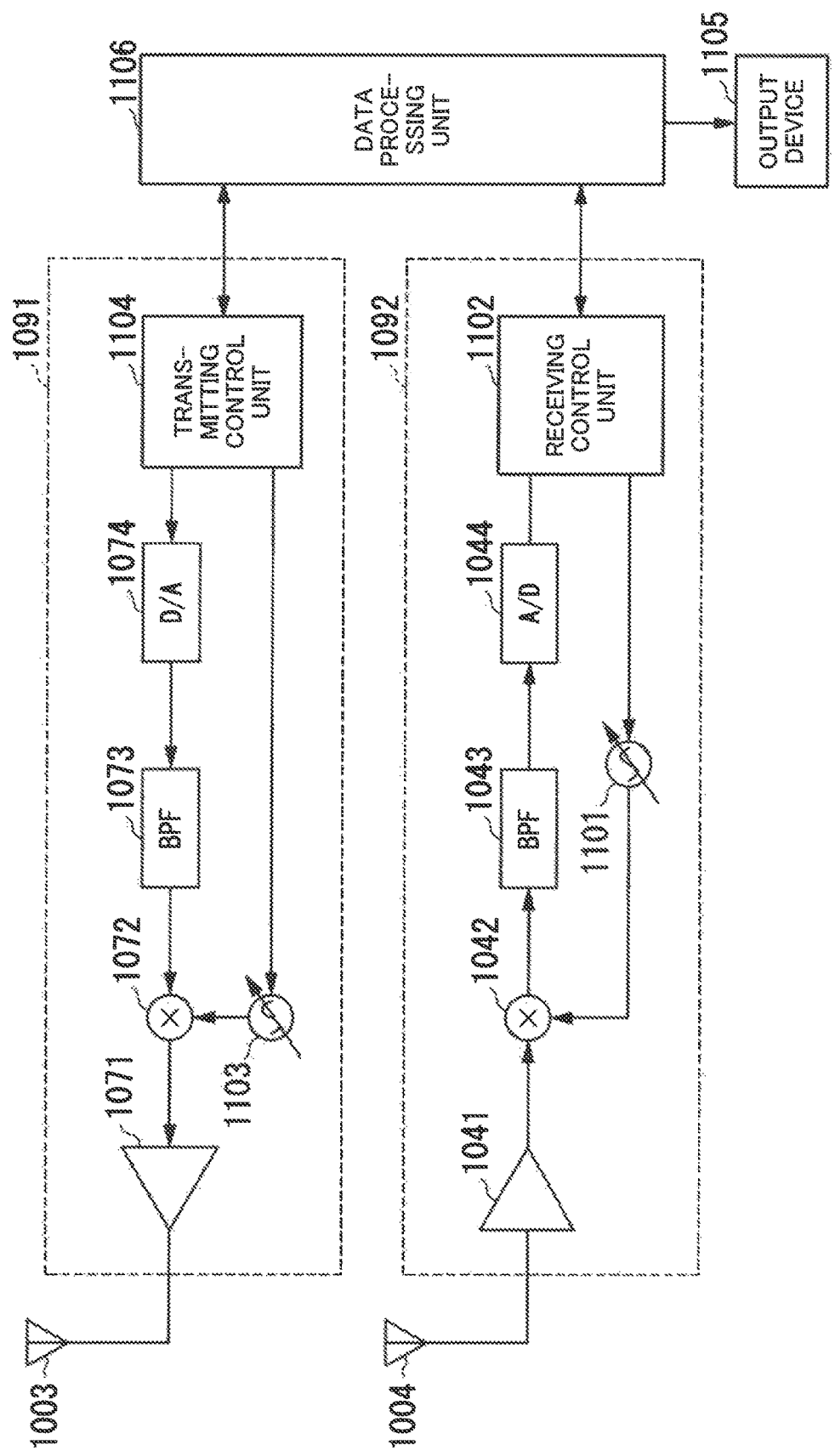
FIG. 5 is a block diagram illustrating an example of a configuration of the object sensing device in the first example embodiment according to the present invention.

FIG. 5 is a block diagram illustrating a configuration of an object sensing device in the first example embodiment according to the present invention. In a configuration of an object sensing device illustrated in FIG. 5, the object sensing device is constituted by the transmitter 1091, the receiver 1092, an output device 1105, and a data processing unit 1106. In FIG. 5, a case that the transmitter 1091 performs an operation of switching an RF frequency of a radio wave 1010 to be transmitted depending on a time is described.

As illustrated in FIG. 5, the transmitter 1091 includes the transmission antenna 1003. Further, the transmitter 1091 includes a power amplifier 1071, a mixer 1072, a band-pass filter (BPF) 1073, a digital-to-analog converter 1074, an oscillator 1103 having a frequency variable function, and a transmitting control unit 1104.

In the transmitter 1091 illustrated in FIG. 5, the transmitting control unit 1104 outputs, to the digital-to-analog converter 1074, a digital signal carrying information on complex amplitudes of an RF signal to be transmitted from the transmission antenna 1003. The digital-to-analog converter 1074 converts the input digital signal to an analog signal (intermediate frequency signal/IF signal), and outputs the analog signal to the band-pass filter 1073. The analog IF signal input to the band-pass filter 1073 is output to the mixer 1072. Further, the oscillator 1103 having a frequency variable function outputs a local oscillation signal (LO signal) toward the mixer 1072. The mixer 1072 generates an RF signal from the analog IF signal and the LO signal input to the mixer 1072, and outputs the RF signal to the power amplifier 1071. The power amplifier 1071 amplifies the input RF signal, and outputs the amplified signal to the transmission antenna 1003. The transmission antenna 1003 transmits the input RF signal as a radio wave 1010.

In the transmitter 1091 illustrated in FIG. 5, a method for switching an RF frequency of the radio wave 1010 depending on a time is implemented by changing a frequency of an LO signal to be output from the oscillator 1103 having a frequency variable function. A carrier frequency of the radio wave 1010 to be output from the transmission antenna 1003 is also changed. As already described, in the present example embodiment, a plurality of values are employed for a carrier frequency of the radio wave 1010 to be output from the transmission antenna 1003.

As illustrated in FIG. 5, the receiver 1092 includes the reception antenna 1004. Further, the receiver 1092 includes a low-noise amplifier 1041, a mixer 1042, a band-pass filter (BPF) 1043, an analog-to-digital converter 1044, an oscillator 1101 having a frequency variable function, and a receiving control unit 1102.

As described with reference to FIG. 1 to FIG. 2, the reception antenna 1004 included in the receiver 1092 receives a radio wave (reflected wave) 1007 reflected from the target object 1001. After the reflected wave 1007 received by the reception antenna 1004 is amplified by the low-noise amplifier 1041, the reflected wave 1007 is output toward the mixer 1042. The receiver 1092 includes the oscillator 1101 having a frequency variable function. The oscillator 1101 outputs a local oscillation signal (LO signal) toward the mixer 1042. The mixer 1042 generates an intermediate frequency signal (IF signal) from the LO signal and the RF signal input to the mixer 1042, and outputs the IF signal toward the band-pass filter (BPF) 1043. The IF signal is converted to a digital signal by the analog-to-digital converter 1044 via the band-pass filter 1043, and the digital signal is input to the receiving control unit 1102. Complex amplitudes of the reflected wave 1007 are acquired from the digital signal.

After complex amplitudes of the reflected wave 1007 received by the reception antenna 1004 are acquired by the receiving control unit 1102 by the above-described processing, the complex amplitudes are transmitted to the data processing unit 1106. Further, complex amplitudes of the radio wave 1010 transmitted from the transmission antenna 1003 are transmitted from the transmitting control unit 1104 to the data processing unit 1106. The data processing unit 1106 performs estimation of an incoming direction of the reflected wave 1007 and imaging processing (image generation) of the target object 1001, from the complex amplitudes of the reflected wave 1007 being a received radio wave, and the complex amplitudes of the radio wave 1010 being a transmitted RF signal. A data processing result of the data processing unit 1106 (specifically, a result on incoming direction estimation and image generation) is output to the output device 1105.

A carrier frequency of the radio wave 1010 to be transmitted from the transmission antenna 1003 of the transmitter 1091, and a carrier frequency of the reflected wave 1007 to be received by the reception antenna 1004 of the receiver 1092 are the same.

A case where the transmitter 1091 performs an operation of switching an RF frequency of the radio wave 1010 to be transmitted depending on a time is described. Since a carrier frequency of the radio wave 1010 to be transmitted from the transmitter 1091 has a plurality of values, the reflected wave 1007 to be received by the receiver 1092 also has a plurality of values. In the present example embodiment, the receiving control unit 1102 is able to acquire complex amplitudes of the reflected wave 1007, even when a carrier frequency of the reflected wave 1007 is changed by changing a frequency of an LO signal to be output from the oscillator 1101 in the receiver 1092.

Figure 6:
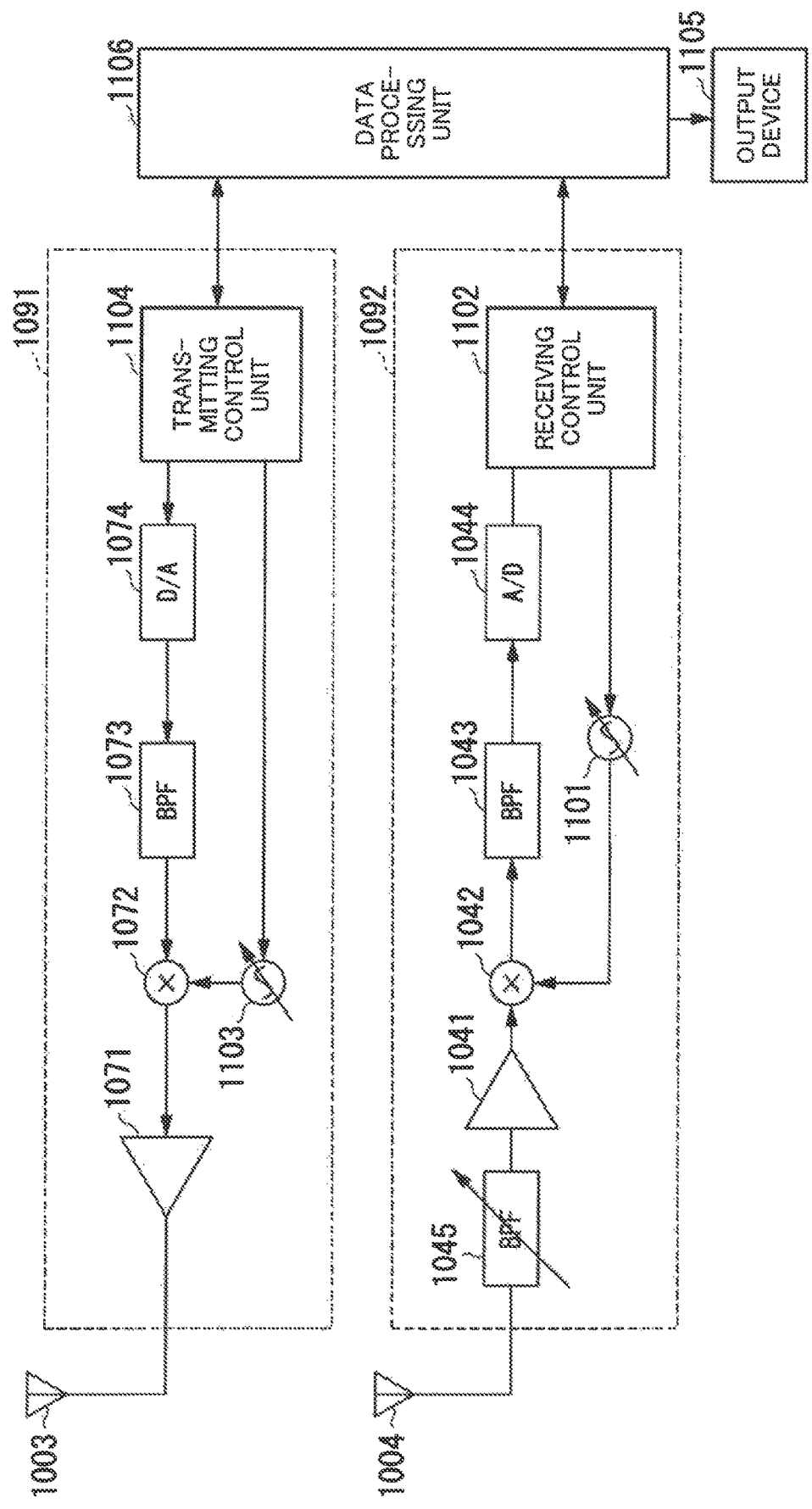
FIG. 6 is a block diagram illustrating an example of a configuration of the object sensing device in the first example embodiment according to the present invention.

Next, FIG. 6 is a block diagram illustrating a configuration of an object sensing device when the transmitter 1091 simultaneously transmits a radio wave 1010 of a plurality of RF frequencies. A configuration of an object sensing device illustrated in FIG. 6 is substantially common to a configuration of an object sensing device illustrated in FIG. 5. In the following, a difference of a configuration of FIG. 6 with respect to a configuration illustrated in FIG. 5 is described.

A method for simultaneously transmitting the radio wave 1010 of a plurality of RF frequencies in the transmitter 1091 illustrated in FIG. 6 is implemented by outputting a modulated signal with wide bandwidth from the transmitting control unit 1104 to the digital-to-analog converter 1074. At this occasion, the band-pass filter 1073 may desirably have a bandwidth capable of transmitting a modulated signal with wide bandwidth. Further, in a configuration illustrated in FIG. 6, the oscillator 1103 is not necessarily required to have a frequency variable function.

Next, in the receiver 1092 illustrated in FIG. 6, a variable band-pass filter 1045 is added between the reception antenna 1004 and the low-noise amplifier 1041. A transmitting frequency of the variable band-pass filter 1045 is controlled by the receiving control unit 1102. The variable band-pass filter 1045 selects a transmitting frequency with respect to a reflected wave 1007 received by the reception antenna 1004. Further, the receiver 1092 is able to receive the reflected wave 1007 of a plurality of RF frequencies by switching a frequency to be selected depending on a time.

In an example illustrated in FIG. 5 and FIG. 6, one transmitter 1091 and one receiver 1092 are illustrated. Alternatively, a plurality of transmitters 1091 and a plurality of receivers 1092 may be provided. Further, the data processing unit 1106 and the output device 1105 may be incorporated in the transmitter 1091 or the receiver 1092. Further, in an example embodiment illustrated in FIG. 1 to FIG. 2, the transmitter 1091 and the receiver 1092 may be synchronized via the data processing unit 1106.

Figure 2:
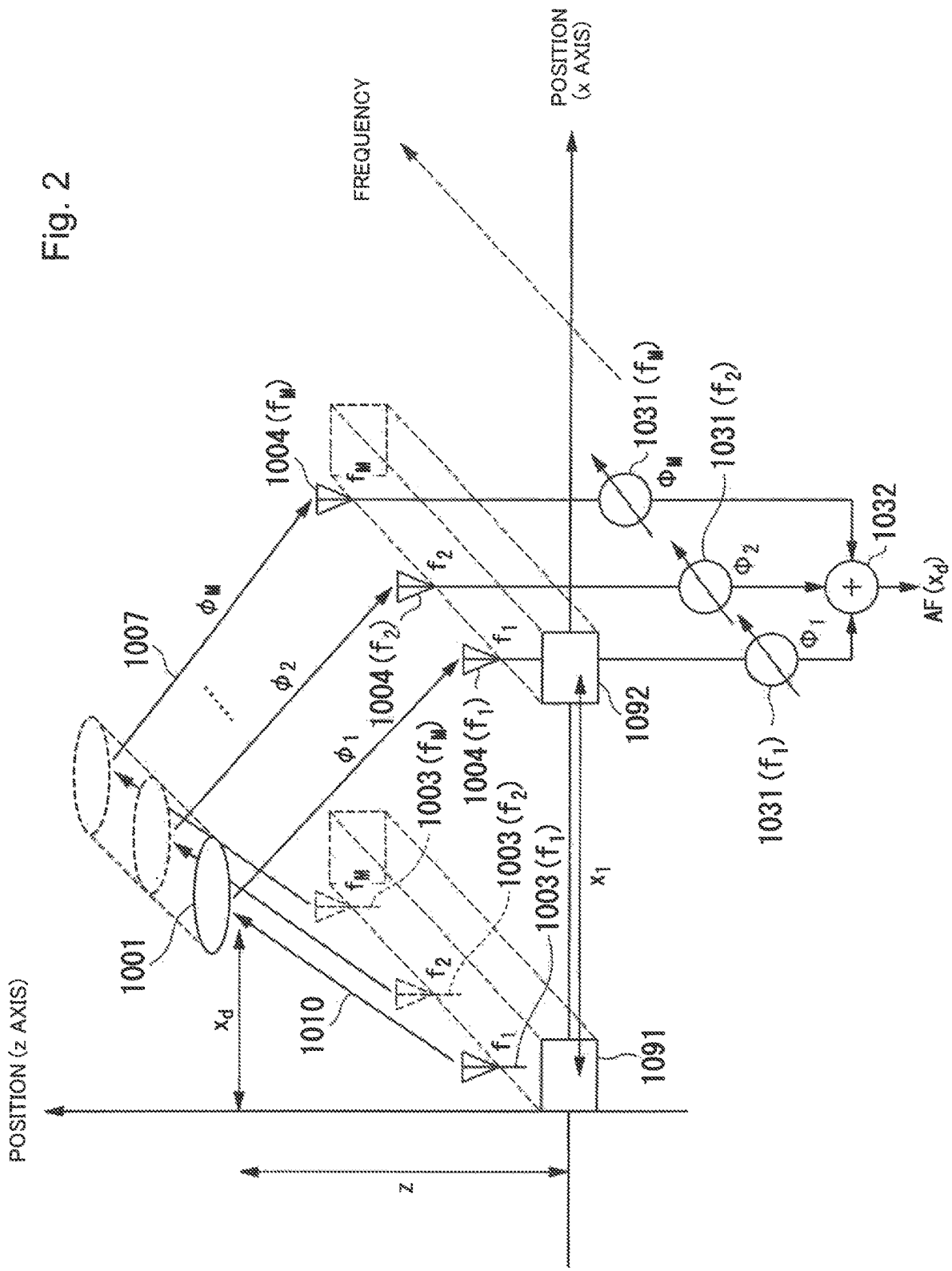
FIG. 2 is a diagram illustrating a configuration and principles of the object sensing device and an object sensing method in the first example embodiment according to the present invention.

In the present example embodiment, it is assumed that phase rotation amounts by the phase shifters $1031(f_1)$, $1031(f_2)$, ..., and $1031(f_M)$ illustrated in FIG. 2, and addition by the adder 1032 are implemented by digital processing. The digital processing is carried out by the data processing unit 1106.

An object sensing device described in the first example embodiment is applicable to estimating a position (particularly, a one-dimensional direction) of a target object 1001 as described in a second example embodiment, or displaying a disposition condition and a shape of a target object 1001 as a two-dimensional image as described in a third example embodiment. These processes are also carried out by the data processing unit 1106.

Second Example Embodiment

In a second example embodiment, a method for estimating a position (particularly, a one-dimensional direction) of a target object 1001 by using an object sensing device described in the first example embodiment is described.

Figure 7:
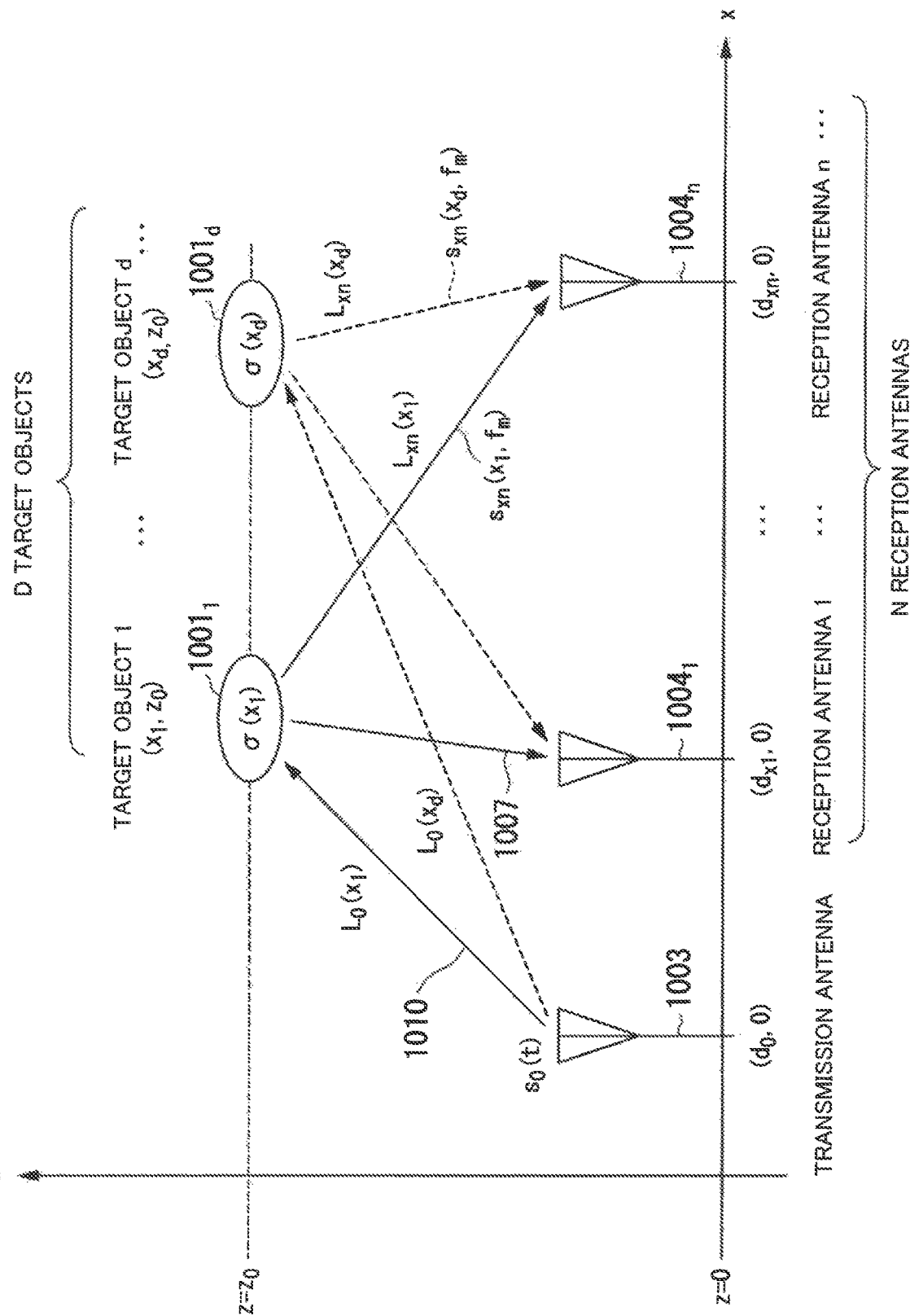
FIG. 7 is a diagram illustrating a configuration and principles of an object sensing device and an object sensing method in a second example embodiment according to the present invention.

FIG. 7 illustrates a model diagram for describing an operation of the second example embodiment. In the model diagram illustrated in FIG. 7, one transmission antenna 1003, and N reception antennas $1004_1, \ldots, 1004_n, \ldots,$ and $1004_N$ are assumed. The transmission antenna 1003 and the reception antenna 1004 are installed on an x-axis (z=0). It is assumed that a position of the transmission antenna 1003 is $(d_0, 0)$ in terms of (x, z) coordinates. Further, it is assumed that positions of the N reception antennas 1004 are $(d_{x1}, 0)$, $(d_{x2}, 0), \ldots,$ and $(d_{xN}, 0)$. Note that an operation is possible, even when a number N of reception antennas per direction is a minimum number i.e. 1. In order to apply generality to a theory, herein, a case where N reception antennas are provided is handled. Further, it is assumed that the target object 1001 is installed at D positions $(x_1, z_0)$, $(x_2, z_0)$, ..., and $(x_D, z_0)$ on an axis where $z=z_0$. For simplification, it is assumed that a positional relationship between the transmission antenna 1003, the reception antenna 1004, and the target object 1001 is fixed at the above-described positions.

RF signals of M carrier frequencies $f_1, f_2, \ldots,$ and $f_M$ are transmitted from the transmission antenna 1003. The transmitter 1091 (transmission antenna 1003) transmits a CW signal irrespective of a carrier frequency. Specifically, it is assumed that complex amplitudes of a radio wave 1010 have a constant value (complex number) $s_0$ that does not depend on a carrier frequency. The reception antenna 1004 receives a reflected wave 1007 from the target object 1001. A carrier frequency of the reflected wave 1007 has M carrier frequencies $f_1, f_2, \ldots,$ and $f_M$ similarly to the radio wave 1010. It is assumed that the receiver 1092 acquires a signal per carrier frequency by causing the transmitter 1091 to perform frequency sweeping, or causing the receiver 1092 to separate signals per carrier frequency (in a state that the transmitter 1091 transmits broadband signals).

It is assumed that complex amplitudes of a reflected wave 1007 of a carrier frequency $f_m$ (where $m=1, 2, \ldots,$ and M) reflected from a d-th target object 1001$_d$ (where $d=1, 2, \ldots,$ and D) and received by a n-th reception antenna 1004$_n$ are $s_{xn}(x_d, f_m)$ (the suffix xn denotes a signal received by the n-th reception antenna 1004$_n$ disposed in the x-axis direction). Signals to be actually measured by the reception antenna 1004$_n$ are respectively combination of reflected waves 1007 from all target objects 1001$_d$ (where $d=1, 2, \ldots,$ and D). Complex amplitudes $s_{xn}(x_d, f_m)$ of the reflected wave 1007 from individual targets are unknown numbers. When it is assumed that complex amplitudes of a signal to be actually measured by the reception antenna 1004$_n$ is $s'_{xn}(f_m, t)$, the following relationship is established between $s'_{xn}(f_m, t)$ and $s_{xn}(x_d, f_m)$.

[Eq. 7]

$$s'_{xn}(f_m, t) = \sum_{d=1}^{D} s_{xn}(x_d, f_m) + n_{xn}(f_m, t), \quad (7)$$
$$(n = 1, 2, \ldots, N, m = 1, 2, \ldots, M)$$

In Eq. (7), $n_{xn}(f_m, t)$ is noise held by a receiver connected to the n-th reception antenna 1004$_n$.

Next, complex amplitudes $s_{xn}(x_d, f_m)$ of the reflected wave 1007 reflected from respective target objects 1001$_d$ (where $d=1, 2, \ldots,$ and D) and received by the n-th reception antenna 1004$_n$ are analyzed in detail. A distance $L_0(x_d)$ from the transmission antenna 1003 to the target object 1001$_d$, and a distance $L_{xn}(x_d)$ from the n-th transmission antenna 1004$_n$ to the target object 1001$_d$ are given by the following Eqs. (8) and (9).

[Eq. 8]

$$L_0(x_d) = \sqrt{(x_d - d_0)^2 + z_0^2}, \quad (8)$$

[Eq. 9]

$$L_{xn}(x_d) = \sqrt{(x_d - d_{xn})^2 + z_0^2}, \quad (9)$$

The following relationship is established between complex amplitudes $s_0$ of the radio wave 1010 to be transmitted from the transmission antenna 1003, and complex amplitudes $s_{xn}(x_d, f_m)$ of the reflected wave 1007 of a carrier frequency $f_m$ received by the n-th reception antenna 1004$_n$.

[Eq. 10]

$$s_{xn}(x_d, f_m) = s_0 \cdot \sigma(x_d) \exp\left[-j\frac{2\pi f_m}{c}\{L_0(x_d) + L_{xn}(x_d)\}\right]. \quad (10)$$

In Eq. (10), $\sigma(x_d)$ is an unknown number representing a reflectance of the target object 1001$_d$. An exponential term in a right side of Eq. (10) represents a phase shift of a radio wave generated in a path from the transmission antenna 1003 to the reception antenna 1004$_n$ via the target object 1001$_d$.

By substituting Eq. (10) for Eq. (7), the following equation is yielded.

[Eq. 11]

$$s'_{xn}(f_m, t) = s_0 \sum_{d=1}^{D} \sigma(x_d) \exp\left[-j\frac{2\pi f_m}{c}\{L_0(x_d) + L_{xn}(x_d)\}\right] + n_{xn}(f_m, t), \quad (11)$$

When analysis is performed, several signals are defined as follows. The following measurement signal vector $s_x(t)$ is defined by using a signal $s'_{xn}(f_m, t)$ (where $n=1, 2, \ldots$ and N, and $m=1, 2, \ldots,$ and M) in a left side of Eq. (11).

[Eq. 12]

$$s_x(t) = [s'_{x1}(f_1,t), s'_{x1}(f_2,t), \ldots, s'_{x1}(f_M,t), \ldots, s'_{xN}(f_1,t), s'_{xN}(f_2,t) \ldots, s'_{xN}(f_M,t)]^T, \quad (12)$$

A suffix $[\ ]^T$ represents a vector and transpose of a matrix. Next, the following direction matrix A is defined by using an exponential term included in a right side of Eq. (11).

[Eq. 13]

$$A \equiv \begin{pmatrix} A_1 \\ A_2 \\ \vdots \\ A_N \end{pmatrix}, \quad (13)$$

$$A_n \equiv (a_n(x_1), a_n(x_2), \ldots, a_n(x_D)),$$
$$a_n(x_d) \equiv [a_{d(n)(1)}, a_{d(n)(2)}, \ldots, a_{d(n)(M)}]^T,$$
$$a_{d(n)(m)} \equiv \exp\left[-j\frac{2\pi f_m}{c}\{L_{x0}(x_d, y_d) + L_{xn}(x_d, y_d)\}\right],$$
$$(n = 1, 2, \ldots, N, m = 1, 2, \ldots, M, d = 1, 2, \ldots, D)$$

In Eq. (13), a size of a matrix A is MN×D, a size of a matrix $A_n$ is M×D, and a size of a vector $a_n(x_d)$ is M×1. Note that, in the present specification, a size of a matrix is expressed by (number of raws)×(number of columns).

Further, the following desired signal vector s is defined by using variables $s_0$ and $\sigma(x_d)$ in the right side of Eq. (11).

[Eq. 14]

$$s = s_0[\sigma(x_1), \sigma(x_2), \ldots, \sigma(x_D)]^T, \quad (14)$$

Note that, in the present method, determining an evaluation function that reflects $x_d$ dependency (specifically, $\sigma(x_d)$) of a desired signal vector s by measurement by the reception antenna 1004 becomes an object. A distribution and a shape of the target object 1001 are detected from $x_d$ dependency of the desired signal vector s.

A relationship expressed by Eq. (11) can be expressed as the following Eq. (15) by using a measurement signal vector $s_x(t)$, a direction matrix A and a desired signal vector s.

[Eq. 15]

$$s_x(t) = As + n(t), \quad (15)$$

Herein, n(t) is a vector of an (MN×1)-th order in which noise $n_{xn}(f_m, t)$ is an element.

In the present example embodiment, a measurement signal vector $s_x(t)$ defined by Eq. (12) is measured by the reception antenna 1004. Next, the following correlation matrix $R_x$ is calculated by using a measurement signal vector $s_x(t)$ acquired by measurement.

[Eq. 16]

$$R_x \equiv E[s_x(t)s_x^H(t)]^T,$$

$$= \begin{pmatrix} E[|s'_{x1}(f_1,t)|^2] & \cdots & E[s'_{x1}(f_1,t)s'^*_{x1}(f_M,t)] & \cdots & E[s'_{x1}(f_1,t)s'^*_{xN}(f_1,t)] & \cdots & E[s'_{x1}(f_1,t)s'^*_{xN}(f_M,t)] \\ \vdots & & \vdots & & \vdots & & \vdots \\ E[s'_{x1}(f_M,t)s'^*_{x1}(f_1,t)] & \cdots & E[|s'_{x1}(f_M,t)|^2] & \cdots & E[s'_{x1}(f_M,t)s'^*_{xN}(f_1,t)] & \cdots & E[s'_{x1}(f_M,t)s'^*_{xN}(f_M,t)] \\ \vdots & & \vdots & & \vdots & & \vdots \\ E[s'_{xN}(f_1,t)s'^*_{x1}(f_1,t)] & \cdots & E[s'_{xN}(f_1,t)s'^*_{x1}(f_M,t)] & \cdots & E[|s'_{xN}(f_1,t)|^2] & \cdots & E[s'_{xN}(f_1,t)s'^*_{xN}(f_M,t)] \\ \vdots & & \vdots & & \vdots & & \vdots \\ E[s'_{xN}(f_M,t)s'^*_{x1}(f_1,t)] & & E[s'_{xN}(f_M,t)s'^*_{x1}(f_M,t)] & \cdots & E[s'_{xN}(f_M,t)s'^*_{xN}(f_1,t)] & \cdots & E[|s'_{xN}(f_M,t)|^2] \end{pmatrix},$$

Herein, E[u(t)] represents a time average of a signal u(t). When signals of respective carrier frequencies are acquired in a period T, E[u(t)] becomes a time average in the period T. When frequency sweeping is performed, and signals of respective carrier frequencies are acquired at different timings, delay correction is performed, and calculation of a correlation matrix is performed after domains of all signal data are aligned in a range of t=0 to T. In order to perform delay correction, it is required to perform measurement in a state that the transmitter 1091 and the receiver 1092 are synchronized.

By substituting Eq. (15) for definition of the correlation matrix $R_x$ in Eq. (16), a relationship between the correlation matrix $R_x$ and the direction matrix A is derived as expressed by the following Eq. (17).

[Eq. 17]

$$R_x = ASA^H + P_N I, \quad (17)$$

$$S \equiv E[s \cdot s^H]^T,$$

$$= |s_0|^2 \cdot \begin{pmatrix} |\sigma(x_1)|^2 & \sigma(x_1)\sigma^*(x_2) & \cdots & \sigma(x_1)\sigma^*(x_D) \\ \sigma(x_2)\sigma^*(x_1) & |\sigma(x_2)|^2 & & \sigma(x_2)\sigma^*(x_D) \\ \vdots & \vdots & & \vdots \\ \sigma(x_D)\sigma^*(x_1) & \sigma(x_D)\sigma^*(x_2) & \cdots & |\sigma(x_D)|^2 \end{pmatrix},$$

In Eq. (17), $P_N$ denotes noise power, and I denotes a unit matrix of an (MN×MN)-th order. A suffix H represents a complex conjugate transpose. Sizes of a correlation matrix $R_x$, a matrix A, and a matrix S respectively are an (MN×MN)-th order, an (MN×D)-th order, and a (D×D)-th order.

As described in NPL 1, it is known that by applying a multiple signal classification (MUSIC) method to a system in which Eq. (15) and Eq. (17) are established, it is possible to calculate an evaluation function $P_{MU}(x)$ that reflects x-dependency (specifically, σ(x)) of an intensity of a desired signal vector s. However, as an applicable condition of a MUSIC method, it is required that the matrixes A and S in Eq. (17) are full rank matrixes. Full rank is defined that the rank of a matrix coincides with a size of a matrix (a smaller number between the number of rows and the number of columns), and all row vectors and all column vectors in a matrix are all linearly independent.

Since a direction matrix A is a function of a position $x_d$ at which respective column vectors are different, the respective column vectors are independent and become full rank vectors. When elements of a matrix S are observed, and when $\sigma(x_i) = \sigma(x_j)$ (i≠j), a row vector at an i-th row and a row vector at a j-th row in the matrix S have the same values, and become linearly dependent. Therefore, the rank is decreased by one, and the matrix is no longer a full rank matrix. Although Eq. (17) is regarded as simultaneous equations, decreasing the rank of the matrix S is equivalent to decreasing the number of independent equations, and it becomes difficult to acquire information on a desired unknown number $\sigma(x_d)$ (where d=1, 2, . . . , and D).

Figure 8:
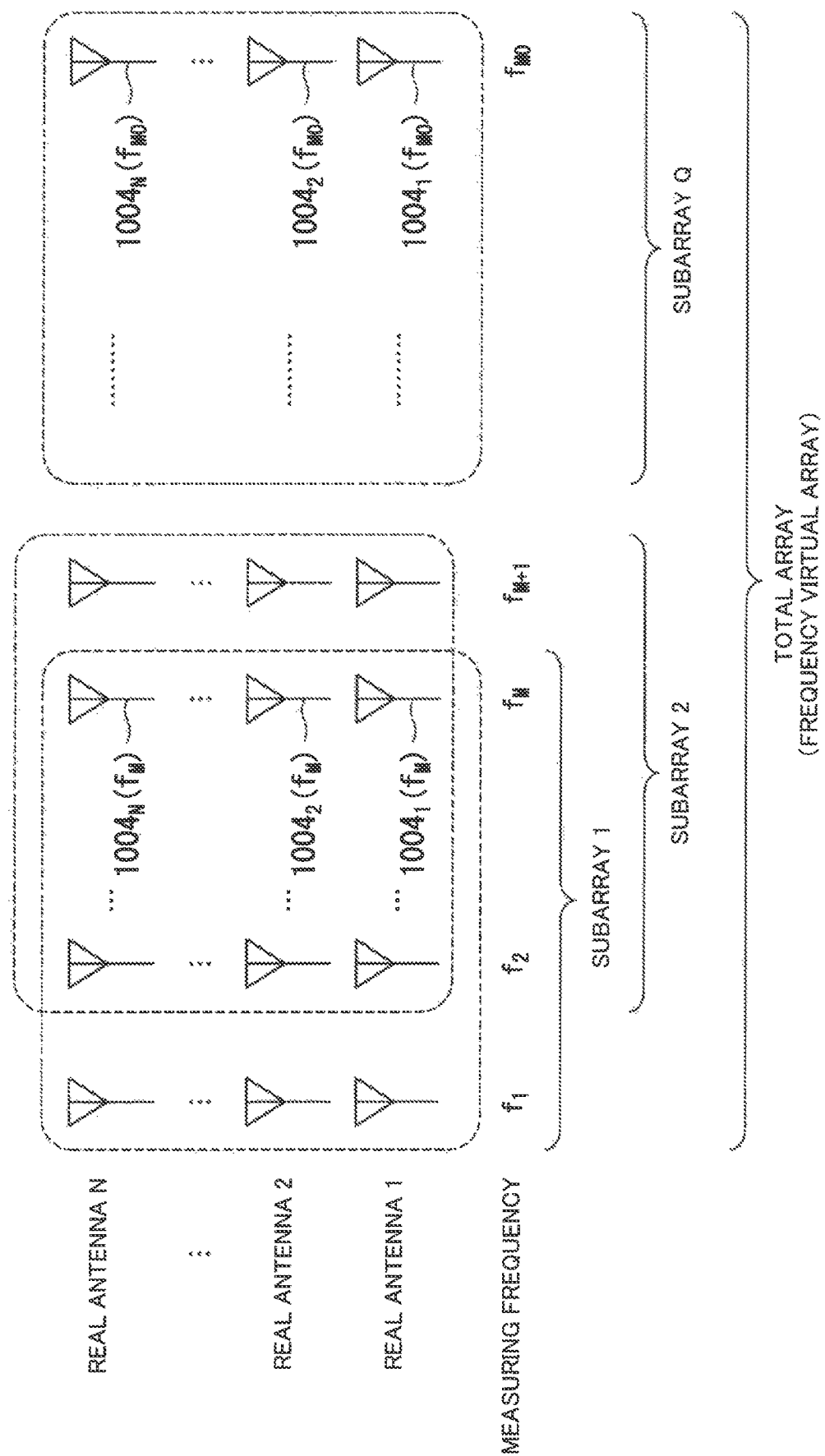
FIG. 8 is a diagram illustrating principles (concept on a subarray) of the object sensing device and the object sensing method in the second example embodiment and an object sensing device and an object sensing method in a third example embodiment according to the present invention.

In the following, a method for returning a matrix S to a full rank matrix by using a concept of a subarray is described. As described in the first example embodiment of the present invention, the present example embodiment is directed to a virtual array in which one frequency is handled as one antenna. In the present example embodiment, as illustrated in FIG. 8, all pieces of data measured by changing a frequency is regarded as a total array, and a group of data acquired for each frequency is regarded as a subarray. A total array is constituted by measurement data of $M_0$ frequencies, and a subarray is constituted by measurement data of M ($M_0$>M) frequencies. When it is assumed that the number of subarrays is Q, a relationship: Q=$M_0$−M+1 is established.

A measurement signal vector $s_{xq}(t)$ of a subarray q (where q=1, 2, . . . , and Q) is defined as follows.

[Eq. 18]

$$s_x^q(t) = [s_{x1}(f_q,t), s_{x1}(f_{q+1},t), \ldots s_{x1}(f_{q+M-1},t), \ldots s_{xN}(f_q,t), s_{xN}(f_{q+1},t), \ldots s_{xN}(f_{q+M-1},t)]^T, \quad (18)$$

At this occasion, the measurement signal vector $s_xq(t)$ of a subarray q in Eq. (18) has a relationship given by the following Eq. (19) between the direction matrix A in Eq. (13), and the desired signal vector s in Eq. (14).

[Eq. 19]

$$s_x^q(t) = \begin{pmatrix} A_1 B_1^{q-1} \\ A_2 B_2^{q-1} \\ \vdots \\ A_N B_N^{q-1} \end{pmatrix} s(t) + n(t),$$

$$B_n \equiv \begin{pmatrix} b_{n1} & 0 & \cdots & 0 \\ 0 & b_{n2} & & 0 \\ \vdots & \vdots & & \vdots \\ 0 & 0 & \cdots & b_{nD} \end{pmatrix},$$

$$b_{nd} \equiv \exp\left[-j\frac{2\pi\Delta f}{c}\{L_0(x_d) + L_{xn}(x_d)\}\right],$$

(19)

Herein, it is assumed that carrier frequencies $f_1, f_2, \ldots,$ and $f_M$ of an RF signal are equi-spaced, and a frequency interval thereof is $\Delta f$. Specifically, it is assumed that $f_m = f_1 + (m-1)\Delta f$, (where $m=1, 2, \ldots,$ and M).

A correlation matrix $R_x^q$ of a subarray q is calculated as expressed by the following Eq. (20).

[Eq. 20]

$$R_x^q \equiv E[s_x^q(t)s_x^{qH}(t)]^T, = A'S'A'^H + P_N I,$$

$$A' \equiv \begin{pmatrix} A_1 & 0 & \cdots & 0 \\ 0 & A_2 & & \vdots \\ \vdots & & \ddots & 0 \\ 0 & \cdots & 0 & A_N \end{pmatrix}, S' \equiv \begin{pmatrix} S'_{11} & S'_{12} & \cdots & S'_{1N} \\ S'_{21} & S'_{22} & \cdots & S'_{2N} \\ \vdots & \vdots & & \vdots \\ S'_{N1} & S'_{N2} & \cdots & S'_{NN} \end{pmatrix},$$

$$S'_{ij} \equiv B_i^{q-1} S (B_j^{q-1})^H.$$

(20)

In Eq. (20), sizes of a correlation matrix $R_x^q$, a matrix A', and a matrix S' respectively are an (NM×NM)-th order, an (NM×ND)-th order, and an (ND×ND)-th order. Next, an average correlation matrix $R'_x$ of all subarrays q (where q=1, 2, ..., and Q) is calculated. A relationship between an average correlation matrix $R'_x$ of all subarrays, and a direction matrix A is calculated as expressed by the following Eq. (21).

[Eq. 21]

$$R'_x \equiv \frac{1}{Q}\sum_{q=1}^{Q} R_x^q = A'S''A'^H + P_N I,$$

$$S'' \equiv \begin{pmatrix} S''_{11} & S''_{12} & \cdots & S''_{1N} \\ S''_{21} & S''_{22} & \cdots & S''_{2N} \\ \vdots & \vdots & & \vdots \\ S''_{N1} & S''_{N2} & \cdots & S''_{NN} \end{pmatrix}, S''_{ij} \equiv \frac{1}{Q}\sum_{q=1}^{Q} B_i^{q-1} S (B_j^{q-1})^H,$$

(21)

The correlation matrix $R'_x$ in Eq. (21) has a configuration of $A'S''A'^H$ similarly to the correlation matrix in Eq. (17). In view of the above, when it is assumed that matrixes A' and S'' are full rank matrixes, it is possible to calculate an evaluation function $P_{MU}(x)$ that reflects x-dependency (specifically, $\sigma(x)$) of an intensity of a desired signal vector s by applying a MUSIC method to the correlation matrix $R'_x$.

Regarding the matrix A', since direction matrixes $A_1$, $A_2$, ..., and $A_N$ are independent and full rank matrixes, the matrix A' given by Eq. (20) is also a full rank matrix.

Next, a matrix S'' is considered. In Eq. (17), a condition that reflectances of all target objects are the same, specifically, a condition: $\sigma = \sigma(x_1) = \sigma(x_2) = \ldots = \sigma(x_D)$ by using σ as a constant is considered. At this occasion, the rank of the matrix S becomes 1, which is a most severe condition when a MUSIC method is applied. Even in this condition, the matrix S'' in Eq. (21) becomes a full rank matrix, when a condition is satisfied. When $\sigma = \sigma(x_1) = \sigma(x_2) = \ldots = \sigma(x_D)$, a calculation result on the matrix S' in Eq. (21) is expressed by the following Eq. (22).

[Eq. 22]

$$S''_{ij} = \frac{\sigma E[|s_0(t)|^2]}{Q} C_i C_j^H,$$

$$C_i \equiv \begin{pmatrix} 1 & b_{i1} & b_{i1}^2 & \cdots & b_{i1}^{Q-1} \\ 1 & b_{i2} & b_{i2}^2 & \cdots & b_{i2}^{Q-1} \\ \vdots & \vdots & \vdots & & \vdots \\ 1 & b_{iD} & b_{iD}^2 & \cdots & b_{iD}^{Q-1} \end{pmatrix},$$

(22)

In a matrix Ci, when $b_{iu} = b_{iv}$, ($u \neq v$), since a row vector at a u-th row and a row vector at a v-th row in a matrix C have the same values, and become linearly dependent, the rank is decreased by one, and the matrix is no longer a full rank matrix. On the other hand, as is clear from Eq. (19), when $b_{id}$ is a function of distances $L_0(x_d)$ and $L_0(x_d)$, and a position $x_d$ differs, these distances have different values. Therefore, a condition that $b_{iu} = b_{iv}$ ($u \neq v$) is not satisfied, and $C_i$ becomes a full rank matrix. Since a matrix size of $C_i$ is D×Q, the rank of $C_i$ is equal to a smaller value between D and Q. Therefore, when Q≥D, a rank of $C_i$ becomes D, the rank of $S''_{ij}$ also becomes D, and a condition on a full rank matrix is satisfied. Further, since respective $S''_{ij}$ are independent, S'' becomes a full rank matrix.

There is a case where the matrix S in Eq. (17) does not become a full rank matrix from a condition that a reflectance $\sigma(x_d)$ may have the same value even when a position $x_d$ differs. On the other hand, it is guaranteed that the matrix S'' becomes a full rank matrix from a property that distances $L_0(x_d)$ and $L_x(x_d)$ always change, when a position $x_d$ is changed.

In a condition: Q<D, the rank of S'' becomes Q, and the rank of S'' is increased by one, each time a number Q of subarrays is increased by one. This can be interpreted that respective subarrays are signal sets independent of one another, and the rank of the matrix S'' is also increased by one, since the number of independent signal sets is increased by one by increasing the number Q of subarrays by one.

Note that when a relationship: $Q = M_0 - M + 1$, and another applicable condition of a MUSIC method: MN≥D+1 are also taken into consideration, a condition on a number $M_0$ of required frequencies is given by the following Eq. (23). Specifically, a number $M_0$ of required frequencies increases in proportion to a number D of positions to be detected.

[Eq. 23]

$$M_0 \geq D - 1 + \frac{D+1}{N} \approx \left(1 + \frac{1}{N}\right)D,$$

(23)

In NPL 1, incoming direction estimation is performed by applying a MUSIC method to a correlation matrix of a general array antenna. In the present example embodiment, an evaluation function $P_{MU}(x)$ that reflects x-dependency (specifically, σ(x)) of an intensity of a desired signal vector s(t) is calculated by applying a MUSIC method (the same method as applied to a formally general array antenna) to the average correlation matrix $R'_x$ of all subarrays calculated in Eq. (21). At this occasion, the evaluation function $P_{MU}(x)$ is given by the following Eq. (24).

[Eq. 24]

$$P_{MU}(x) = \frac{a^H(x)a(x)}{a^H(x)E_N E_N^H a(x)}, \quad (24)$$

Herein, a(x) is a column vector of the direction matrix A defined by Eq. (13). Further, $E_N$ is given by the following Eq. (25).

[Eq. 25]

$$E_N = [e_{D+1}, e_{D+2}, \ldots, e_{MN}], \quad (25)$$

Herein, an eigenvalue of a vector $e_k$ (where k=D+1, D+2, . . . , and MN) is equal to noise power among eigenvectors of a correlation matrix $R'_x$. According to a MUSIC method, the evaluation function $P_{MU}(x)$ in Eq. (24) gives a peak at a position $x_d$ of a target object $1001_d$ (where d=1, 2, . . . , and D). Therefore, it is possible to detect a position $x_d$ of a target object $1001_d$ (where d=1, 2, . . . , and D) from a position x, at which an evaluation function $P_{MU}(x)$ gives a peak value. When a MUSIC method is applied, (MN–D) eigenvectors {$e_{D+1}$, $e_{D+2}$, . . . , and $e_{MN}$} noise spaces are used. Since, at least one eigenvector is required, it is required to satisfy: MN–D≥1, specifically, MN≥D+1.

In the foregoing, a position $x_d$ of a target object $1001_d$ (where d=1, 2, . . . , and D) is detected by using a MUSIC method. It is also possible to calculate an evaluation function that reflects x-dependency (specifically, σ(x)) of an intensity of a desired signal vector s(t) by applying a beam former method, a Capon method, or a linear prediction method (the same method as applied to a formally general array antenna, and described in NPL1) to the correlation matrix $R'_x$. An evaluation function $P_{BF}(x)$ based on a beam former method in the second example embodiment of the present invention is given by the following Eq. (26).

[Eq. 26]

$$P_{BF}(x) \equiv \frac{a^H(x)R'_x a(x)}{a^H(x)a(x)}, \quad (26)$$

Further, an evaluation function $P_{LP}(x)$ based on a Capon method in the second example embodiment of the present invention is given by the following Eq. (27).

[Eq. 27]

$$P_{CP}(x) \equiv \frac{1}{a^H(x)R'^{-1}_x a(x)}. \quad (27)$$

Further, an evaluation function $P_{LP}(x)$ based on a linear prediction method in the second example embodiment of the present invention is given by the following Eq. (28).

[Eq. 28]

$$P_{LP}(x) \equiv \frac{1}{|W_{LP}^H a(x)|^2}, \quad W_{LP} = R'^{-1}_x T, \quad T = [1, 0, \ldots, 0]^T. \quad (28)$$

The above-described evaluation functions $P_{BF}(x)$, $P_{CP}(x)$, and $P_{LP}(x)$ also have a peak value at a position $x_d$ of a target object $1001_d$ (where d=1, 2, . . . , and D), similarly to an evaluation function $P_{MU}(x)$ to be acquired by a MUSIC method. Therefore, it is possible to detect a position $x_d$ of a target object $1001_d$ (where d=1, 2, . . . , and D), from a position x at which an evaluation function gives a peak value.

Processing disclosed in the second example embodiment of the present invention, specifically, processing of calculating an evaluation function from a measurement result of a reflected wave, and detecting a position of a target object from the evaluation function is performed by the data processing unit 1106 in circuit block diagrams of FIG. 5 to FIG. 6. Further, a process of calculating an evaluation function and searching a peak of the evaluation function in the second example embodiment of the present invention is associated with a process of performing control by the phase shifter 1031 and the adder 1032, and searching a beam direction in which a received signal intensity is maximized in the first example embodiment of the present invention.

Processing disclosed in the second example embodiment of the present invention, specifically, processing of calculating an evaluation function from a measurement result of a reflected wave, and detecting a position of a target object from the evaluation function is performed by the data processing unit 1106 in block diagrams of FIG. 5 to FIG. 6.

Note that, in the second example embodiment of the present invention, it is possible to detect only position information $x_d$ (specifically, only a position in a one-dimensional direction) of a coordinate (specifically, x-axis) in a direction connecting the transmitter 1091 and the receiver 1092. This is because since an object sensing device constituted by the transmitter 1091 and the receiver 1092 has rotational symmetry with respect to the x-axis as an axis, it is not possible to distinguish coordinate values, even when coordinate values in axes other than the x-axis of a target object 1001 differ. A method for also detecting position information on coordinate in the axes other than the x-axis is disclosed in a third example embodiment of the present invention.

Figure 9:
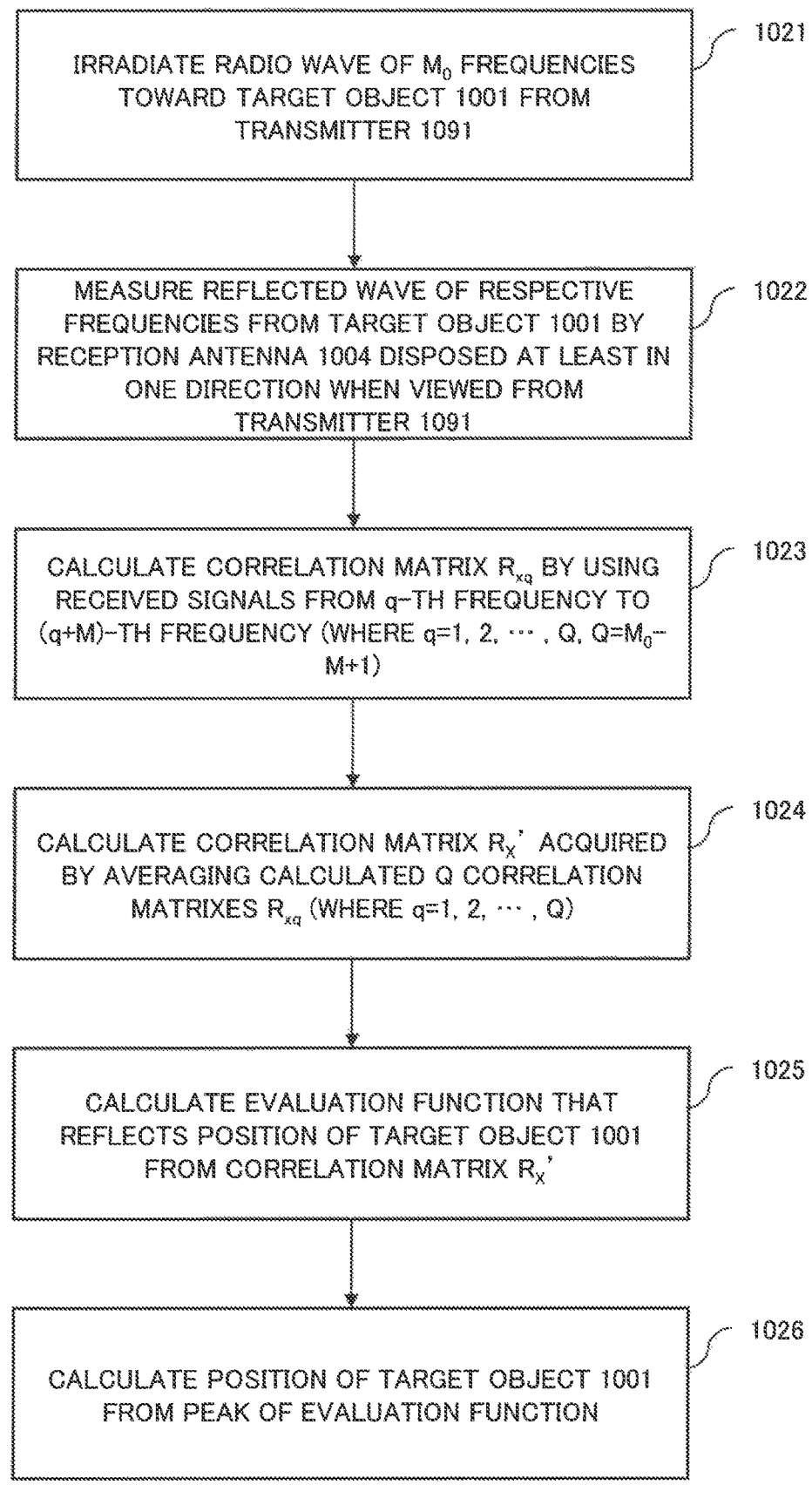
FIG. 9 is a flowchart illustrating the object sensing method in the second example embodiment of the present invention.

An object sensing method in the second example embodiment of the present invention is summarized in a flowchart of FIG. 9. Specifically, the object sensing method is constituted by a step 1021 of irradiating a radio wave of $M_0$ frequencies from the transmitter 1091 toward the target object 1001; a step 1022 of measuring a reflected wave of respective frequencies from the target object 1001 by the reception antenna 1004 disposed at least in one direction when viewed from the transmitter 1091; a step 1023 of calculating a correlation matrix $R^q_x$ (where q=1, 2, . . . , Q, and Q=$M_0$–M+1) by using received signals from a q-th frequency to a (q+M)-th frequency; a step 1024 of calculating a correlation matrix $R'_x$ acquired by averaging the calculated Q correlation matrixes $R^q_x$ (where q=1, 2, . . . , and Q); a step 1025 of calculating an evaluation function that reflects a position of the target object 1001 from the correlation matrix $R'_x$; and a step 1026 of calculating a position of the target object 1001 from a peak of the evaluation function.

Third Example Embodiment

In a third example embodiment of the present invention, a method for generating a two-dimensional image that identifies a disposition or a shape of a target object 1001, based on a concept of the virtual array described in the first example embodiment of the present invention is disclosed.

Figure 10:
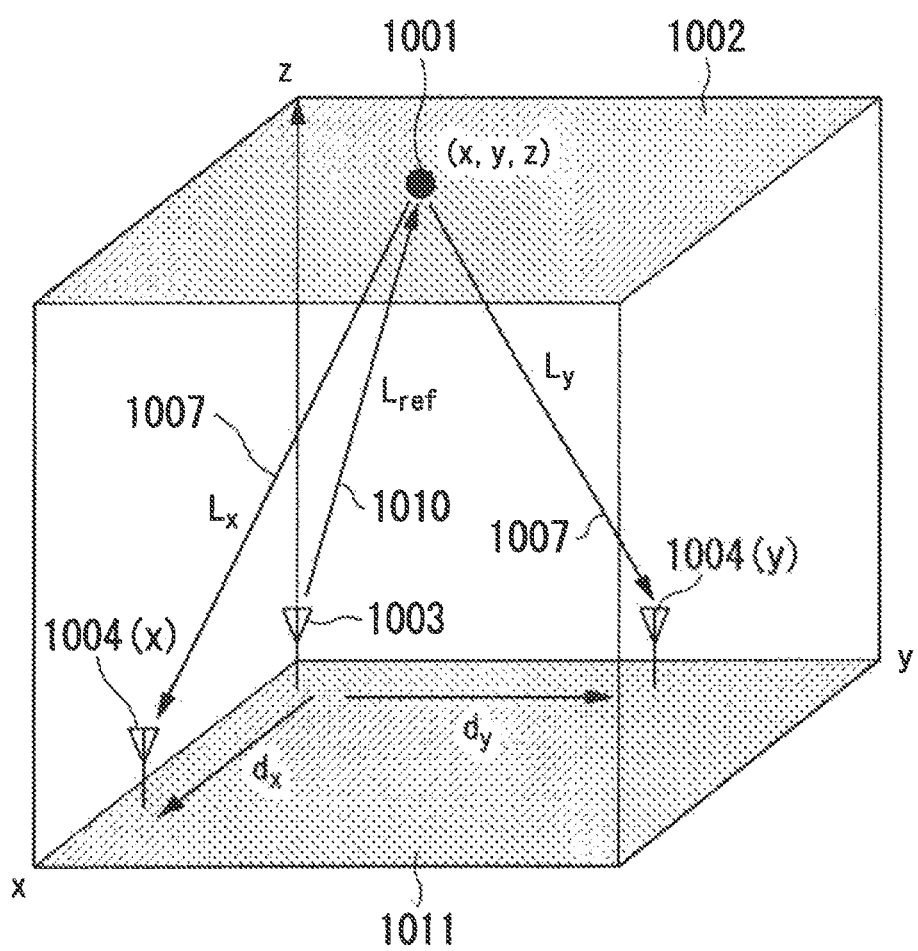
FIG. 10 is a configuration diagram illustrating a configuration of the object sensing device in the third example embodiment according to the present invention.

FIG. 10 is a configuration diagram illustrating a layout of antennas and a target object included in an object sensing device in the third example embodiment according to the present invention. In an example illustrated in FIG. 10, a transmission antenna 1003 of a transmitter 1091 is installed at a position of an origin of coordinates, and reception antennas 1004(x) and 1004(y) of a receiver 1092 are respectively installed on an x-axis and a y-axis. A configuration that a direction connecting the transmission antenna 1003 and the reception antenna 1004(x), and a direction connecting the transmission antenna 1003 and the reception antenna 1004(y) are directions different from each other (not in parallel to each other) is a preferred example embodiment in order to acquire a two-dimensional image. Note that it is not necessarily required that a direction connecting the transmission antenna 1003 and the reception antenna 1004(x), and a direction connecting the transmission antenna 1003 and the reception antenna 1004(y) are orthogonal to each other.

An RF signal (radio wave) 1010 is irradiated from the transmission antenna 1003 toward a target object 1001 present on a focal plane 1002. After the radio wave 1010 is irradiated to the target object 1001, reflected waves 1007(x) and 1007(y) from the target object 1001 are respectively received by the reception antennas 1004(x) and 1004(y). In the third example embodiment of the present invention, a plurality of values are employed for a carrier frequency of the radio wave 1010 to be output from the transmission antenna 1003.

Figure 23:
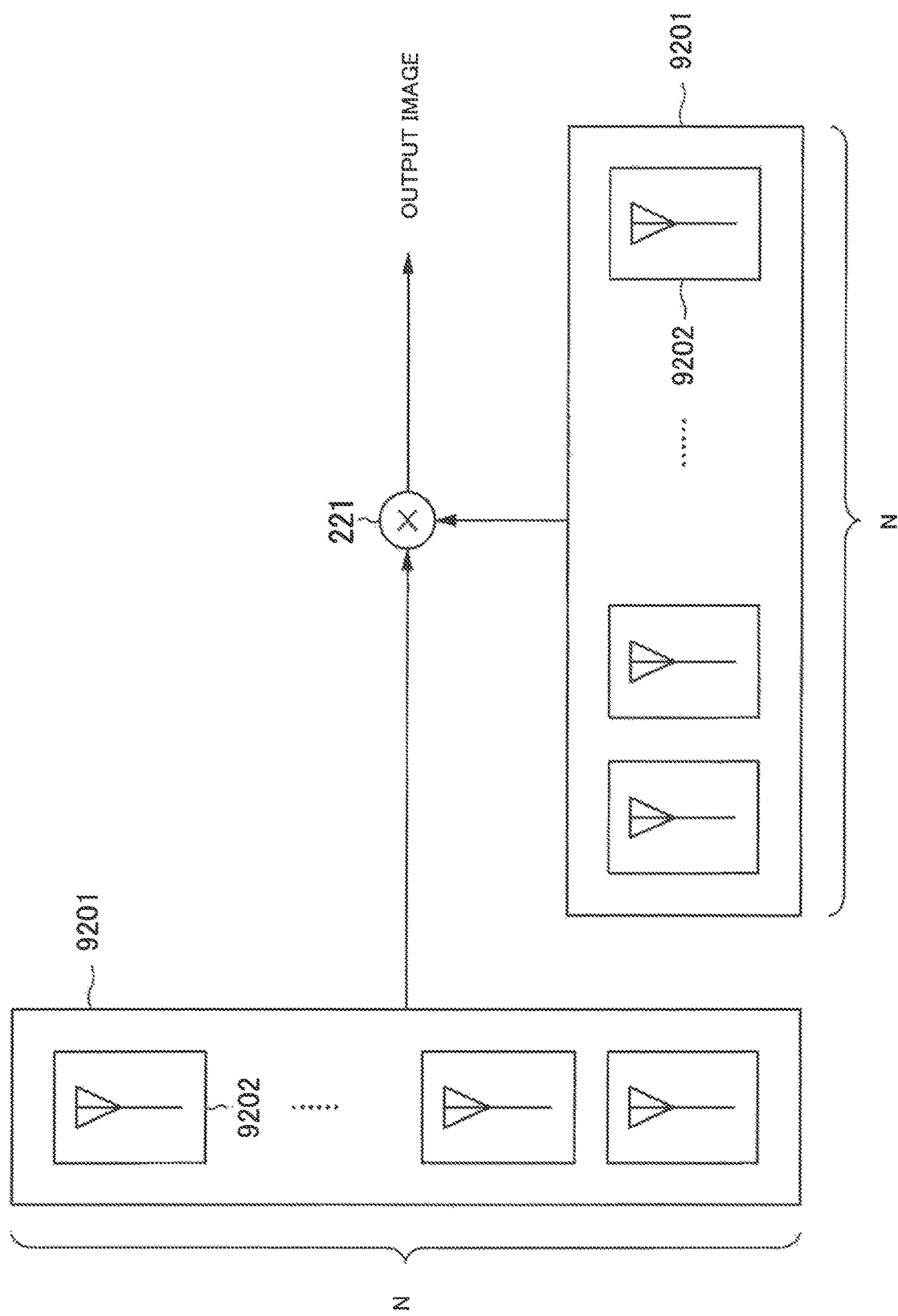
FIG. 23 is a configuration diagram illustrating a configuration of an array antenna method in a general technique.

The third example embodiment illustrated in FIG. 10 is intended to replace the two array antennas 9201 by a Mills cross method illustrated in FIG. 23 by frequency virtual arrays. At this occasion, the two array antennas 9201 by a Mills cross method illustrated in FIG. 23 are replaced by a virtual array constituted by a set of the transmission antenna 1003 and the reception antenna 1004(x), and a virtual array constituted by a set of the transmission antenna 1003 and the reception antenna 1004(y). Therefore, in the third example embodiment of the present invention, it is understood to be sufficient that the minimum number of antennas required for generation of a two-dimensional image is three.

Figure 11:
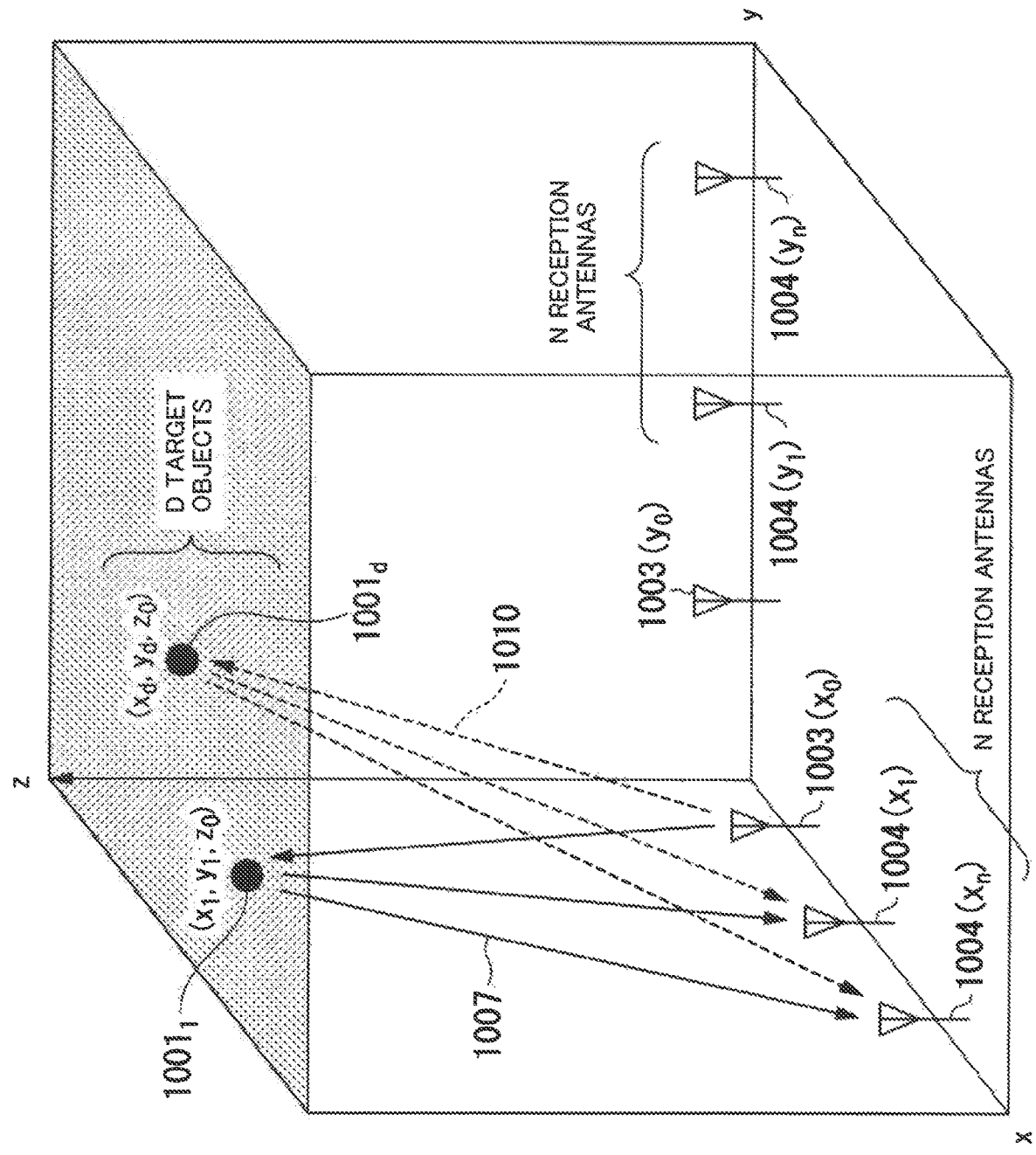
FIG. 11 is a diagram illustrating a configuration and principles of the object sensing device and the object sensing method in the third example embodiment according to the present invention.
Figure 12:
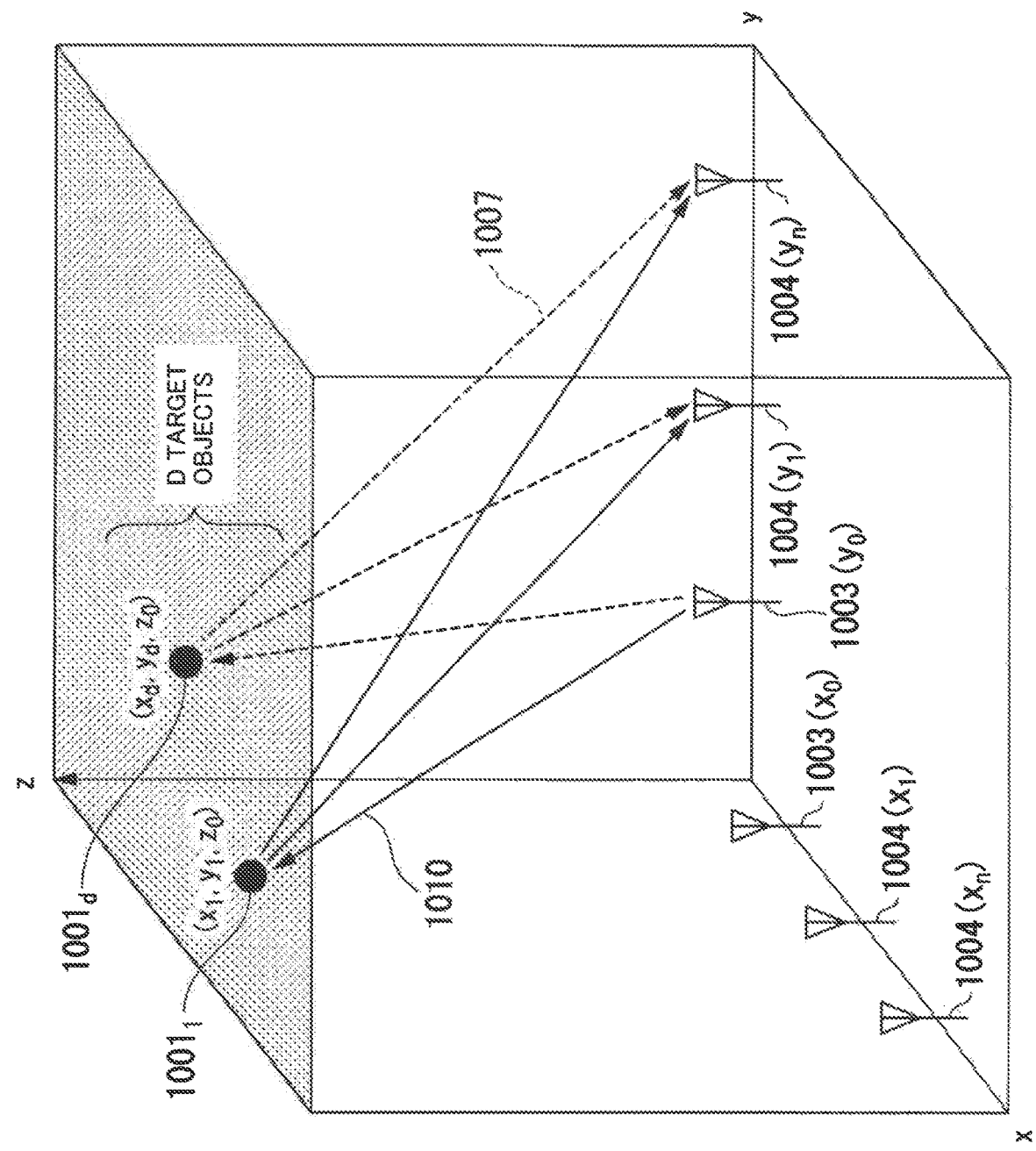
FIG. 12 is a diagram illustrating a configuration and principles of the object sensing device and the object sensing method in the third example embodiment according to the present invention.

Next, details of two-dimensional image generation processing are disclosed. First of all, a method for calculating a correlation matrix of a two-dimensional frequency virtual array is described. FIG. 11 and FIG. 12 illustrate a model diagram for use in analyzing an operation of two-dimensional image generation by a proposed method. In a calculation model of the third example embodiment, it is assumed that one transmission antenna 1003($x_0$) and N reception antennas 1004($x_1$), ..., and 1004($x_N$) are installed on an x-axis; and one transmission antenna 1003($y_0$), and N reception antennas 1004($y_1$), ..., and 1004($y_N$) are installed on a y-axis. It is assumed that, in terms of xyz-axis coordinates, a position of the transmission antenna 1003($x_0$) is ($d_{x0}$, 0, 0), and a position of the n-th reception antenna 1004($x_n$) is ($d_{xn}$, 0, 0) on the x-axis. Further, it is assumed that a position of the transmission antenna 1003($y_0$) is (0, $d_{y0}$, 0), and a position of the n-th reception antenna 1004($y_n$) is (0, $d_{yn}$, 0) on the y-axis. Further, it is assumed that the target object 1001 is installed at D positions ($x_1$, $y_1$, $z_0$), ($x_2$, $y_2$, $z_0$), ..., and ($x_D$, $y_D$, $z_0$) on a plane where $z=z_0$. For simplification, it is assumed that a positional relationship between a device (the transmission antenna 1003 and the reception antenna 1004), and the target object 1001 is fixed at the above-described positions. Further, for the purpose of theoretical calculation, as illustrated in FIG. 11, it is assumed that, when the transmission antenna 1003($x_0$) on the x-axis performs transmission, only the reception antennas 1004($x_1$), ..., and 1004($x_N$) on the x-axis perform receiving; and when the transmission antenna 1003($y_0$) on the y-axis performs transmission, only the reception antennas 1004($y_1$), ..., and 1004($y_N$) on the y-axis perform receiving. Herein, the transmission antennas 1003($x_0$) and 1003($y_0$) are individually disposed on the x-axis and the y-axis. This is to apply generality to theoretical description. Practically, the transmission antennas 1003($x_0$) and 1003($y_0$) may be integrated as one antenna. In this case, reception antennas on the x-axis and the y-axis may simultaneously perform receiving, when the one transmission antenna performs transmission.

Similarly to other example embodiments of the present invention, also in the third example embodiment, the transmission antenna 1003($x_0$) and 1003($y_0$) transmit a radio wave 1010 of M carrier frequencies $f_1$, $f_2$, ..., and $f_M$. Modulating the ratio wave 1010 to a CW signal (non-modulated signal) irrespective of a carrier frequency is a preferred example embodiment.

It is assumed that complex amplitudes of a reflected wave 1007 of a carrier frequency $f_m$ (where m=1, 2, ..., and M) reflected from a target object 1001$_d$ (where d=1, 2, ..., and D) and received by the n-th reception antenna 1004($x_n$) on the x-axis are $s_{xn}(x_d, y_d, f_m)$. Further, it is assumed that complex amplitudes of a received signal actually measured by the n-th reception antenna 1004($x_n$) on the x-axis (combination of reflected waves from respective targets) are $s_x(f_m, t)$. The following relationship is established between $s_{xn}(f_m, t)$, and $s_{xn}(x_d, y_d, f_m)$.

[Eq. 29]

$$s_{xn}(f_m,t)=\sum_{d=1}^{D}s_{xn}(x_d,y_d,f_m)+n_{xn}(f_m,t),(n=1,2,\ldots,N,m=1,2,\ldots,M) \quad (29)$$

In Eq. (29), $n_{xn}(f_m, t)$ is noise held by the receiver 1092 connected to the n-th reception antenna 1004($x_n$) on the x-axis.

When signals $s_{yn}(f_m, t)$, $s_{yn}(x_d, y_d, f_m)$, and $n_{yn}(f_m, t)$ are defined similarly regarding the n-th reception antenna 1004($y_n$) on the y-axis, a relationship similar to Eq. (29) is also established as follows.

[Eq. 30]

$$s_{yn}(f_m,t)=\sum_{d=1}^{D}s_{yn}(x_d,y_d,f_m)+n_{yn}(f_m,t),(n=1,2,\ldots,N,m=1,2,\ldots,M) \quad (30)$$

When it is assumed that a distance between the target object 1001$_d$ and the transmission antenna 1003($x_0$) on the x-axis, and a distance between the target object 1001$_d$ and the n-th reception antenna 1004($x_n$) on the x-axis are respectively $L_{x0}(x_d, y_d)$, and $L_{xn}(x_d, y_d)$, these distances are given by the following Eqs. (31) and (32).

[Eq. 31]

$$L_{x0}(x_d,y_d)=\sqrt{(x_d-d_{x0})^2+y_d^2+z_0^2}, \quad (31)$$

[Eq. 32]

$$L_{xn}(x_d,y_d)=\sqrt{(x_d-d_{xn})^2+y_d^2+z_0^2}, \quad (32)$$

Likewise, when it is assumed that a distance between the target object $1001_d$ and the transmission antenna $1003(y_0)$ on the y-axis, and a distance between the target object $1001_d$ and the n-th reception antenna $1004(y_n)$ on the y-axis are respectively $L_{y0}(x_d, y_d)$, and $L_{yn}(x_d, y_d)$, these distances are given by the following Eqs. (33) and (34).

[Eq. 33]

$$L_{y0}(x_d, y_d) = \sqrt{x_d^2 + (y_d - d_{y0})^2 + z_0^2}, \quad (33)$$

[Eq. 34]

$$L_{yn}(x_d, y_d) = \sqrt{x_d^2 + (y_d - d_{yn})^2 + z_0^2}, \quad (34)$$

The following relationship is established between complex amplitudes $s_0$ of an RF signal to be transmitted from the transmission antenna $1003(x_0)$, and complex amplitudes $s_{xn}(x_d, y_d, f_m)$ of an RF signal of a carrier frequency $f_m$ received by the n-th reception antenna $1004(x_n)$ on the x-axis.

[Eq. 35]

$$s_{xn}(x_d, y_d, f_m) = \qquad (35)$$
$$s_0 \cdot \sigma(x_d, y_d) \exp\left[-j\frac{2\pi f_m}{c}\{L_{x0}(x_d, y_d) + L_{xn}(x_d, y_d)\}\right],$$

$\sigma(x_d, y_d)$ is an unknown number representing a reflectance of a target object $1001_d$ (where d=1, 2, ..., and D). A similar relationship is established regarding the reception antenna $1004(y_n)$ on the y-axis.

[Eq. 36]

$$s_{yn}(x_d, y_d, f_m) = \qquad (36)$$
$$s_0 \cdot \sigma(x_d, y_d) \exp\left[-j\frac{2\pi f_m}{c}\{L_{y0}(x_d, y_d) + L_{yn}(x_d, y_d)\}\right],$$

By substituting Eq. (35) for Eq. (29), and substituting Eq. (36) for Eq. (30), the following equations are yielded.

[Eq. 37]

$$s_{xn}(f_m, t) = \qquad (37)$$
$$s_0 \sum_{d=1}^{D} \sigma(x_d, y_d) \exp\left[-j\frac{2\pi f_m}{c}\{L_{x0}(x_d, y_d) + L_{xn}(x_d, y_d)\}\right] +$$
$$n_{xn}(f_m, t),$$

[Eq. 38]

$$s_{yn}(f_m, t) = \qquad (38)$$
$$s_0 \sum_{d=1}^{D} \sigma(x_d, y_d) \exp\left[-j\frac{2\pi f_m}{c}\{L_{y0}(x_d, y_d) + L_{yn}(x_d, y_d)\}\right] +$$
$$n_{yn}(f_m, t),$$

Next, the following measurement signal vector $s_x(t)$ is defined by using a measurement signal $s_{xn}(f_m, t)$ in the n-th reception antenna $1004(x_n)$ (where n=1, 2, ..., and N) on the x-axis.

[Eq. 39]

$$s_x(t) = [s_{x11}(t), \ldots, s_{x1M}(t), \ldots, s_{xN1}(t), \ldots, s_{xNM}(t)]^T,$$
$$s_{xNM}(t) = s_{xn}(f_m, t), (n=1, 2, \ldots, N, m=1, 2, \ldots, M,) \qquad (38)$$

Likewise, a measurement signal in the reception antenna $1004(y_n)$ (where n=1, 2, ..., and N) in the y-axis direction is defined as follows.

[Eq. 40]

$$s_y(t) = [s_{y11}(t), \ldots, s_{y1M}(t), \ldots, s_{yN1}(t), \ldots, s_{yNM}(t)]^T,$$
$$s_{yvw}(t) = s_{yv}(f_w, t), (v=1, 2, \ldots, N, w=1, 2, \ldots, M,) \qquad (40)$$

Next, a product is acquired regarding all combinations of elements of the x-axis-direction measurement vector $s_x(t)$ in Eq. (39) and the y-axis-direction measurement vector $s_y(t)$ in Eq. (40) in accordance with a Mills cross method, and the following direct product vector $s_{xy}(t)$ is generated.

[Eq. 41]

$$s_{xy(nv)(mw)}(t) = s_{xmn}(t) s_{yvw}(t), (n, v=1, 2, \ldots, N, m, w=1, 2, \ldots, M,)$$

$$s_{xy}(t) = [s_{xy(11)(11)}(t), s_{xy(11)(12)}(t), \ldots,$$
$$s_{xy(11)(1M)}(t), \ldots,$$
$$s_{xy(11)(M1)}(t), s_{xy(11)(M2)}(t), \ldots, s_{xy(11)(MM)}(t), \ldots,$$
$$s_{xy(1N)(11)}(t), s_{xy(1N)(12)}(t), \ldots, s_{xy(1N)(1M)}(t), \ldots,$$
$$s_{xy(1N)(M1)}(t), s_{xy(1N)(M2)}(t), \ldots, s_{xy(1N)(MM)}(t), \ldots,$$
$$s_{xy(NN)(11)}(t), s_{xy(NN)(12)}(t), \ldots, s_{xy(NN)(1M)}(t), \ldots,$$
$$s_{xy(NN)(M1)}(t), s_{xy(NN)(M2)}(t), \ldots, s_{xy(NN)(MM)}(t),]^T \qquad (41)$$

In Eq. (41), n and v are respectively numbers of antennas disposed in the x-direction and the y-direction, and m and w are respectively suffixes representing frequency numbers of signals received by the antennas disposed in the x-direction and the y-direction.

Next, a direction matrix A is defined as follows.

[Eq. 42]

$$A \equiv \begin{pmatrix} A_{11} \\ A_{12} \\ \vdots \\ A_{1N} \\ \vdots \\ A_{N1} \\ \vdots \\ A_{NN} \end{pmatrix}, \qquad (42)$$

$$A_{nv} = (a_{nv}(x_1, y_1), a_{nv}(x_2, y_2), \ldots, a_{nv}(x_D, y_D)),$$

$$a_{nv}(x_d, y_d) = \begin{bmatrix} a_{d(nv)(11)}, a_{d(nv)(12)}, \ldots, a_{d(nv)(1M)}, \ldots, \\ a_{d(nv)(M1)}, a_{d(nv)(M2)}, \ldots, a_{d(nv)(MM)} \end{bmatrix}^T,$$

$$a_{d(nv)(mn)} = \exp\begin{bmatrix} -j\frac{2\pi f_m}{c}\{L_{x0}(x_d, y_d) + L_{xn}(x_d, y_d)\} - \\ -j\frac{2\pi f_m}{c}\{L_{y0}(x_d, y_d) + L_{yv}(x_d, y_d)\} \end{bmatrix},$$

In Eq. (42), a size of a direction matrix A is $(MN)^2 \times D$, a size of a matrix Anv is $M^2 \times D$, and a size of a vector $a_{nv}(x_d, y_d)$ is $M^2 \times 1$. The matrix $A_{nv}$ is a direction matrix involving the n-th x-direction antenna $1004(x_n)$, and the v-th y-direction antenna $1004(y_v)$. The direction matrix A of a whole system becomes a matrix acquired by integrating direction matrixes $A_{nv}$ of sets (n, v) of all antenna numbers.

Similarly to the above-described case on one-dimensional incoming direction estimation, the following desired signal vector s is defined by using complex amplitudes $s_0$ and a reflectance $\sigma(x_d, y_d)$.

[Eq. 43]

$$s = s_0[\sigma(x_1, y_1), \sigma(x_2, y_2), \ldots \sigma(x_D, y_D)]^T, \quad (43)$$

From Eqs. (37) and (38), the following relational expression is acquired between the measurement signal vector $s_{xy}(t)$ in Eq. (41), the direction matrix A in Eq. (42), and the desired signal vector s in Eq. (43).

[Eq. 44]

$$s_{xy}(t) = As + n(t) \quad (44)$$

In Eq. (44), n(t) is a vector term involving noise. Next, a correlation matrix $R_{xy}$ is calculated by using the measurement signal vector $s_x(t)$ in Eq. (41) acquired by measurement. The following relationship between a correlation matrix $R_{xy}$ and a direction matrix A is given from the relationship expressed by Eq. (44).

[Eq. 45]

$$R_{xy} \equiv E[s_{xy}(t)s_{xy}^H(t)] = ASA^H + P_N I, \quad (45)$$

$$S \equiv E[s \cdot s^H]^T = |s_0|^2 \cdot \begin{pmatrix} |\sigma(x_1)|^2 & \sigma(x_1)\sigma^*(x_2) & \ldots & \sigma(x_1)\sigma^*(x_D) \\ \sigma(x_2)\sigma^*(x_1) & |\sigma(x_2)|^2 & & \sigma(x_2)\sigma^*(x_D) \\ \vdots & \vdots & & \vdots \\ \sigma(x_D)\sigma^*(x_1) & \sigma(x_D)\sigma^*(x_2) & \ldots & |\sigma(x_D)|^2 \end{pmatrix},$$

In Eq. (45), $P_N$ is average power of a noise term n(t), and I is a unit matrix of an $(MN)^2 \times (MN)^2$-th order. Sizes of a correlation matrix $R_{xy}$, a matrix A, and a matrix S respectively is an $(MN)^2 \times (MN)^2$-th order, an $(MN)^2 \times D$-th order, and a D×D-th order.

Since Eqs. (44) and (45) are the same types as Eqs. (15) and (17) in one-dimensional incoming direction estimation discussed in the second example embodiment of the present invention, it is possible to calculate an evaluation function $P_{MU}(x, y)$ that reflects $\sigma(x_d, y_d)$ by applying a MUSIC method to a correlation matrix $R_{xy}$ in accordance with the same procedure as one-dimensional incoming direction estimation. However, similarly to a case of one-dimensional incoming direction estimation, it is required that the matrixes A and S in Eq. (45) are full rank matrixes, as an applicable condition of a MUSIC method. Further, similarly to the above-described discussion, although the direction matrix A is a full rank matrix, the matrix S is not a full rank matrix when $\sigma(x_i) = \sigma(x_j)$ (i≠j). Therefore, it is required to perform processing in such a way that the matrix S becomes a full rank matrix by a subarray method.

Also in a case of two-dimensional image generation, one subarray is configured by M frequencies, and Q subarrays are configured in accordance with the same procedure as a subarray method in one-dimensional incoming direction estimation discussed in the second example embodiment of the present invention. When it is assumed that a total number of frequencies is $M_0$, a relationship: $Q = M_0 - M + 1$ is established. A q-th subarray signal is defined as follows. A signal acquired by simultaneously shifting suffixes m and w representing a frequency of a component $s_{xy(nv)(mw)}(t)$ of a signal vector $s_{xy}(t)$ by $+(q-1)$ becomes the q-th subarray signal.

[Eq. 46]

$$s_{xy}^q(t) = [s_{xy(11)(qq)}(t), s_{xy(11)(q,q+1)}(t), \ldots,$$
$$s_{xy(11)(q,M+q-1)}(t), \ldots,$$
$$s_{xy(11)(M+q-1,q)}(t), s_{xy(11)(M+q-1,q+1)}(t), \ldots,$$
$$s_{xy(11)(M+q-1,M+q-1)}, \ldots,$$
$$s_{xy(1N)(qq)}(t), s_{xy(1N)(q,q+1)}(t), \ldots,$$
$$s_{xy(1N)(q,M+q-1)}(t), \ldots,$$
$$s_{xy(1N)(M+q-1,q)}(t), s_{xy(1N)(M+q-1,q+1)}(t),$$
$$s_{xy(1N)(M+q-1,M+q-1)}, \ldots,$$
$$s_{xy(NN)(qq)}(t), s_{xy(NN)(q,q+1)}(t), \ldots,$$
$$s_{xy(NN)(q,M+q-1)}(t), \ldots,$$
$$s_{xy(NN)(M+q-1,q)}(t), s_{xy(NN)(M+q-1,q+1)}(t),$$
$$s_{xy(NN)(M+q-1,M+q-1)}]^T \quad (46)$$

The following relational expression is established between the subarray signal $s_{xy}^q(t)$ in Eq. (46) and the direction matrix in Eq. (42).

[Eq. 47]

$$s_{xy}^q(t) = \begin{pmatrix} A_{11}B_{11}^{q-1} \\ A_{12}B_{12}^{q-1} \\ \vdots \\ A_{1N}B_{1N}^{q-1} \\ \vdots \\ A_{nv}B_{nv}^{q-1} \\ \vdots \\ A_{N1}B_{N1}^{q-1} \\ \vdots \\ A_{NN}B_{NN}^{q-1} \end{pmatrix} s(t) + n(t), \quad B_{nv} \equiv \begin{pmatrix} b_{nv1} & 0 & \ldots & 0 \\ 0 & b_{nv2} & & 0 \\ \vdots & \vdots & & \vdots \\ 0 & 0 & \ldots & b_{nvD} \end{pmatrix}, \quad (47)$$

$$b_{nvd} = \exp\left[-j\frac{2\pi\Delta f}{c}\{L_{x0}(x_d, y_d) + L_{xn}(x_d, y_d)\} - j\frac{2\pi\Delta f}{c}\{L_{y0}(x_d, y_d) + L_{yv}(x_d, y_d)\}\right],$$

A correlation matrix $R_x^q$ of a subarray q is calculated as expressed by the following Eq. (48).

[Eq. 48]

$$R_{xy}^q \equiv E[s_{xy}^q(t)s_{xy}^{qH}(t)]^T = A'S'A'^H + P_N I, \quad (48)$$

$$A' \equiv \begin{pmatrix} A_{11} & 0 & \cdots & & & \cdots & 0 \\ 0 & A_{12} & & & & & \vdots \\ & & \ddots & & & & \\ & & & A_{1N} & & & \\ & & & & \ddots & & \\ & & & & & A_{N1} & \vdots \\ \vdots & & & & & \ddots & 0 \\ 0 & \cdots & & & & \cdots & 0 & A_{NN} \end{pmatrix},$$

$$S' \equiv \begin{pmatrix} S'_{11} & S'_{12} & \cdots & S'_{1,N\wedge 2} \\ S'_{21} & S'_{22} & \cdots & S'_{2,N\wedge 2} \\ \vdots & \vdots & & \vdots \\ S'_{N\wedge 2,1} & S'_{N\wedge 2,2} & \cdots & S'_{N\wedge 2,N\wedge 2} \end{pmatrix},$$

$$S'_{ij} \equiv B'^{q-1}_i S \left( B'^{q-1}_j \right)^H$$

$$B'_i \equiv B_{nv},$$

$$(i = v + (n-1)N, \ n, v = 1, 2, \ldots, N,)$$

In Eq. (48), sizes of a correlation matrix $R^q_{xy}$, a matrix A', and a matrix S' respectively is an $(NM)^2 \times (NM)^2$-th order, an $(NM)^2 \times N^2 D$-th order, and an $N^2 D \times N^2 D$-th order. Next, an average correlation matrix $R'_{xy}$ of all subarrays q (where q=1, 2, ..., and Q) is calculated. A relationship between an average correlation matrix $R'_{xy}$ of all subarrays, and a direction matrix A' is calculated as expressed by the following Eq. (49).

[Eq. 49]

$$R'_{xy} \equiv \frac{1}{Q}\sum_{q=1}^{Q} R^q_{xy} = A'S''A'^H + P_N I, \quad (49)$$

$$S'' \equiv \begin{pmatrix} S''_{11} & S''_{12} & \cdots & S''_{1,N\wedge 2} \\ S''_{21} & S''_{22} & \cdots & S''_{2,N\wedge 2} \\ \vdots & \vdots & & \vdots \\ S''_{N\wedge 2,1} & S''_{N\wedge 2,2} & \cdots & S''_{N\wedge 2,N\wedge 2} \end{pmatrix},$$

$$S'''_{ij} \equiv \frac{1}{Q}\sum_{q=1}^{Q} B'^{q-1}_i S \left( B'^{q-1}_j \right)^H,$$

The following matters are clear by similar discussion as in a case of one-dimensional incoming direction estimation described in the second example embodiment of the present invention.
(1) When matrixes A' and S are full rank matrixes, it is possible to calculate an evaluation function $P_{MU}(x, y)$ that reflects $\sigma(x_d, y_d)$ by applying a MUSIC method to a correlation matrix $R'_{xy}$.
(2) Regarding the matrix A', since direction matrixes $A_{11}$, $A_{12}$, ..., $A_{1N}$, ..., $A_{N1}$, ..., and $A_{NN}$ are independent and full rank matrixes, A' to be given by Eq. (48) also becomes a full rank matrix.
(3) When the condition: Q≥D is satisfied, the matrix S'' becomes a full rank matrix.
An applicable condition MN≥D+1 of a MUSIC method in one-dimensional incoming direction estimation becomes $(MN)^2 \geq D+1$ in two-dimensional image generation. When this matter, and conditions: Q=$M_0$−M+1 and Q≥D in a subarray are taken into consideration, a condition on a number $M_0$ of required frequencies is given by the following Eq. (50). Specifically, a number $M_0$ of required frequencies increases substantially proportional to a number D of positions to be detected.

[Eq. 50]

$$M_0 \geq D - 1 + \frac{\sqrt{D+1}}{N} \approx \left(1 + \frac{1}{N\sqrt{D}}\right)D, \quad (50)$$

Next, an evaluation function $P_{MU}(x, y)$ that reflects $\sigma(x_d, y_d)$ is calculated by applying a MUSIC method to the average correlation matrix $R'_{xy}$ of all subarrays calculated by Eq. (49). Consequently, an evaluation function is acquired as follows.

[Eq. 51]

$$P_{MU}(x, y) = \frac{a^H(x, y)a(x, y)}{a^H(x, y)E_N E_N^H a(x, y)}, \quad (51)$$

Herein, $a(x, y)$ is a column vector of the direction matrix A defined by Eq. (42). Further, $E_N$ is given by the following equation.

[Eq. 52]

$$E_N = [e_{D+1}, e_{D+2}, \ldots, e_{(MN)02}], \quad (52)$$

Herein, a vector $e_k$ (where k=D+1, D+2, ..., and $(MN)^2$) is one of eigenvectors of a correlation matrix $R'_{sxy}$ whose eigenvalue is equal to noise power.

An evaluation function $P_{MU}(x, y)$ gives a peak at a position $(x_d, y_d)$ (where d=1, 2, ..., and D) of a target object $1001_d$. Therefore, it is possible to detect position information $(x_d, y_d)$ (where d=1, 2, ..., and D) of a target object $1001_d$ from the evaluation function $P_{MU}(x, y)$, and detect a distribution or a shape of a target object 1001 therefrom.

In the foregoing, a position of a target object $1001_d$ (where d=1, 2, ..., and D) is detected by using a MUSIC method. Alternatively, it is also possible to calculate an evaluation function of respective methods by applying a beam former method, a Capon method, or a linear prediction method (the same method as applied to a formally general array antenna, and described in NPL 1) to a correlation matrix $R'_{sxy}$.

In accordance with the above-described observation, an evaluation function $P_{BF}(x, y)$ based on a beam former method in the third example embodiment of the present invention is given by the following Eq. (53).

[Eq. 53]

$$P_{BF}(x, y) = \frac{a^H(x, y)R'_{sxy}a(x, y)}{a^H(x, y)a(x, y)}, \quad (53)$$

Further, an evaluation function $P_{CP}(x, y)$ based on a Capon method in the third example embodiment of the present invention is given by the following Eq. (54).

[Eq. 54]

$$P_{CP}(x, y) = \frac{1}{a^H(x, y) R'^{-1}_{sxy} a(x, y)}, \qquad (54)$$

Further, an evaluation function $P_{LP}(x, y)$ based on a linear prediction method in the third example embodiment of the present invention is given by the following Eq. (55).

[Eq. 55]

$$P_{LP}(x, y) \equiv \frac{1}{|W^H_{LP} a(x, y)|^2}, \; W_{LP} \equiv R'^{-1}_{sxy} T, \; T \equiv [1, 0, \ldots, 0]^T, \qquad (55)$$

The above-described evaluation functions $P_{BF}(x, y)$, $P_{CP}(x, y)$, and $P_{LP}(x, y)$ also have a peak value at a position $(x_d, y_d)$ of a target object $1001_d$ (where d=1, 2, ..., and D), similarly to the evaluation function $P_{MU}(x, y)$ to be acquired by a MUSIC method. Therefore, it is possible to detect a position $x_d$ of a target object $1001_d$ (where d=1, 2, ..., and D) from a position (x, y) at which an evaluation function gives a peak value.

Processing disclosed in the third example embodiment of the present invention, specifically, processing of calculating an evaluation function from a measurement result of a reflected wave, and detecting a position of a target object from the evaluation function is performed by the data processing unit 1106 in circuit block diagrams of FIG. 5 to FIG. 6. Further, a process of calculating an evaluation function and searching a peak of the evaluation function in the third example embodiment of the present invention is associated with a process of performing control by the phase shifter 1031 and the adder 1032, and searching a beam direction in which a received signal intensity is maximized in the first example embodiment of the present invention.

Figure 13:
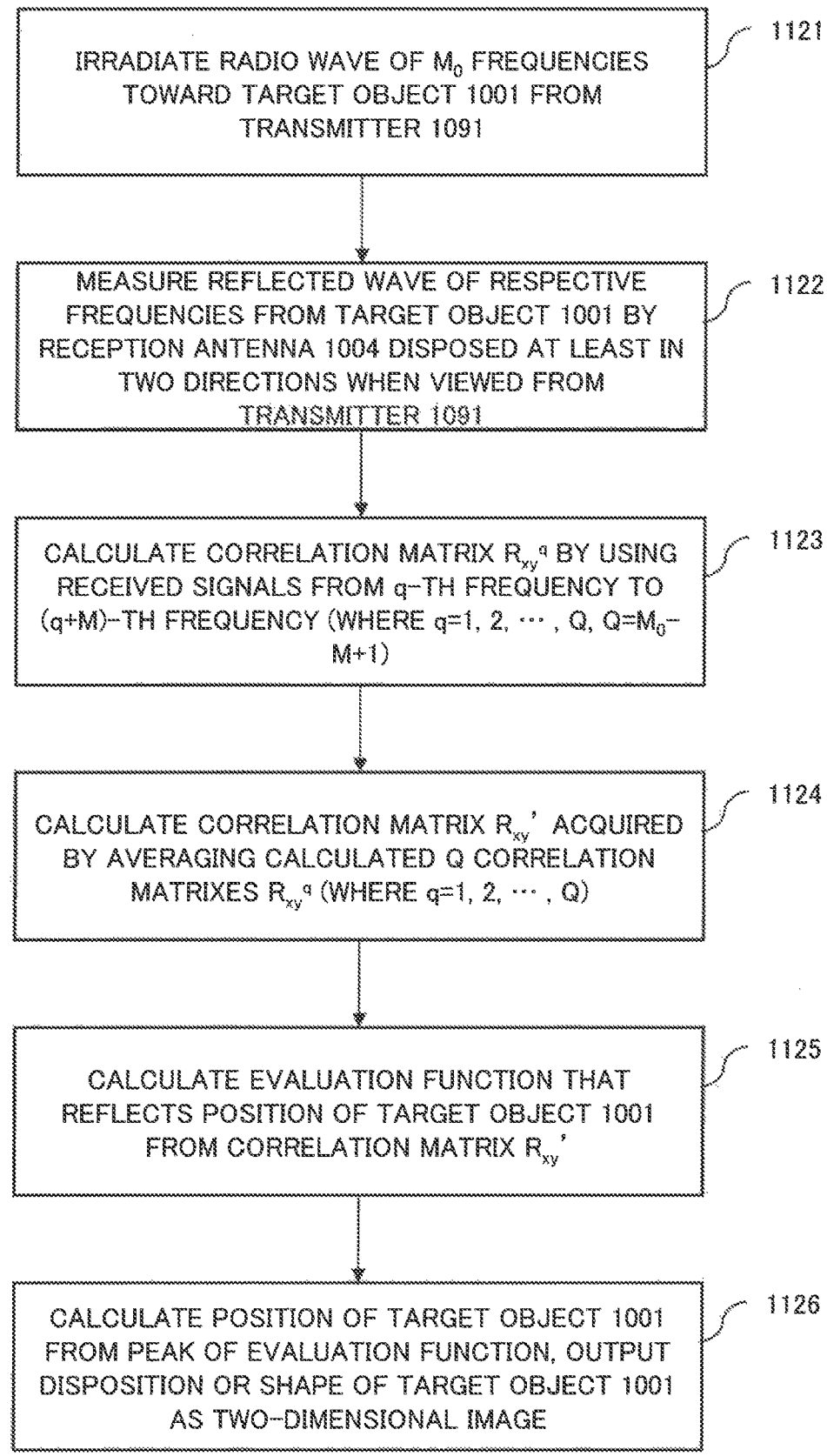
FIG. 13 is a flowchart illustrating the object sensing method in the third example embodiment of the present invention.

An object sensing method in the third example embodiment of the present invention is summarized in a flowchart of FIG. 13. Specifically, the object sensing method is constituted by a step 1121 of irradiating a radio wave of $M_0$ frequencies from the transmitter 1091 toward the target object 1001; a step 1122 of measuring a reflected wave of respective frequencies from the target object 1001 by the reception antenna 1004 disposed at least in one direction when viewed from the transmitter 1091; a step 1123 of calculating a correlation matrix $R^q_{xy}$ (where q=1, 2, ..., Q, and Q=$M_0$−M+1) by using received signals from a q-th frequency to a (q+M)-th frequency; a step 1124 of calculating a correlation matrix $R'_{xy}$ acquired by averaging the calculated Q correlation matrixes $R^q_{xy}$ (where q=1, 2, ..., and Q); a step 1125 of calculating an evaluation function that reflects a position of the target object 1001 from the correlation matrix $R'_{xy}$; and a step 1126 of calculating a position of the target object 1001 from a peak of the evaluation function, and outputting a disposition or a shape of the target object 1001 as a two-dimensional image.

Figure 14:
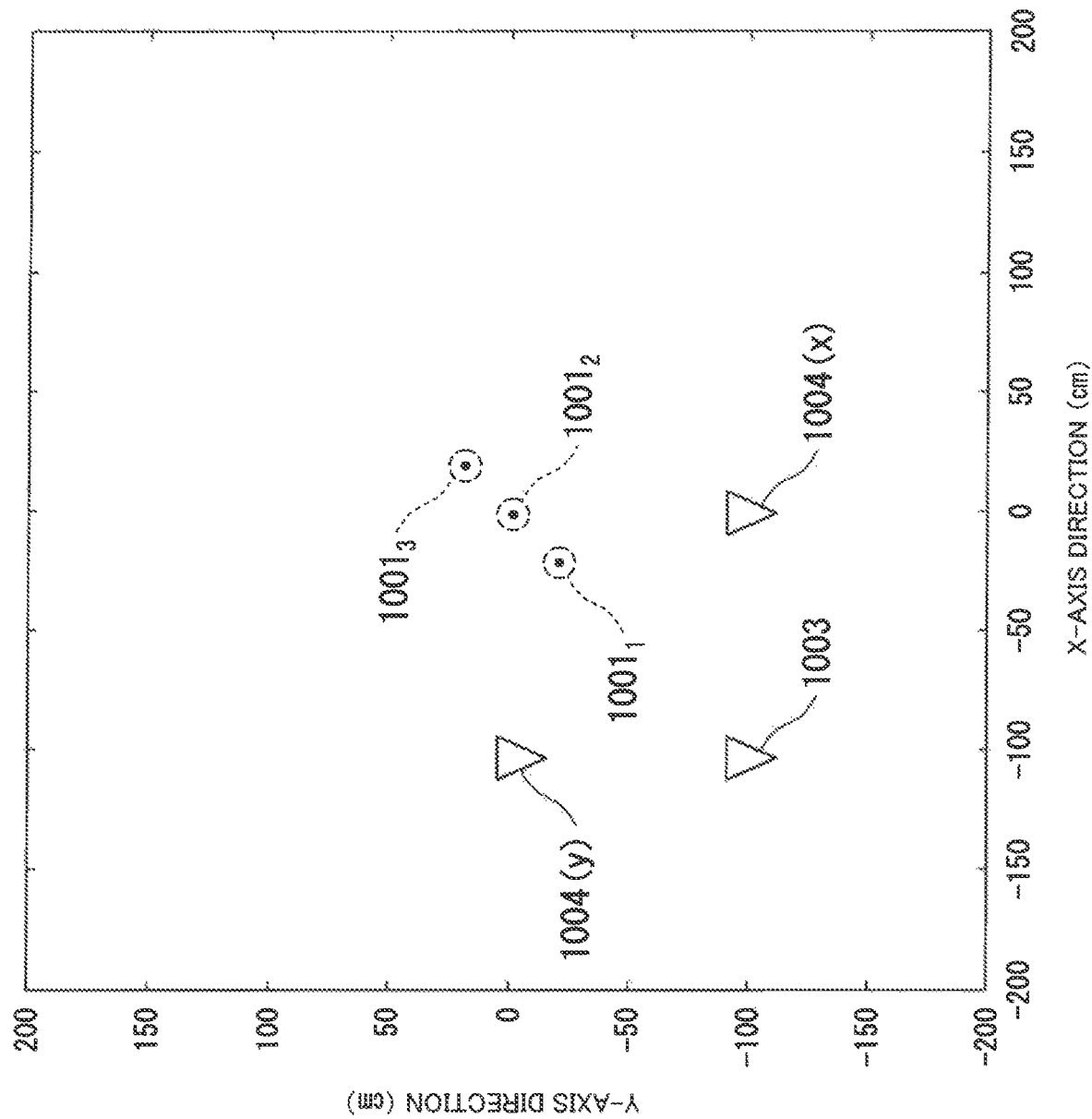
FIG. 14 is an example of a two-dimensional image acquired by the object sensing device and the object sensing method in the third example embodiment of the present invention.

FIG. 14 illustrates an example of a two-dimensional image to be acquired by an object sensing device and an object sensing method described in the third example embodiment of the present invention. Herein, the target object 1001 is disposed at three positions in terms of (x, y, z) coordinates i.e. at positions (−20 cm, −20 cm, 100 cm), (0 cm, 0 cm, 100 cm), and (20 cm, 20 cm, 100 cm). Further, the transmission antenna 1003 is disposed at a position (−100 cm, −100 cm, 0 cm), and the reception antenna 1004 is disposed at positions (0 cm, −100 cm, 0 cm) and (−100 cm, 0 cm, 0 cm). The transmission antenna 1003 irradiates, toward the target object 1001, a radio wave 1010 of a carrier frequency from 76 GHz to 81 GHz at a frequency interval of 250 MHz. It is assumed that a number $M_0$ of all frequencies is 21, a number Q of subarrays is 10, and a number M of frequencies per subarray is 12. As illustrated in FIG. 14, the target object 1001 actually disposed at three positions can be detected, and the target object 1001 is displayed as a two-dimensional image in FIG. 14.

Fourth Example Embodiment

Figure 15:
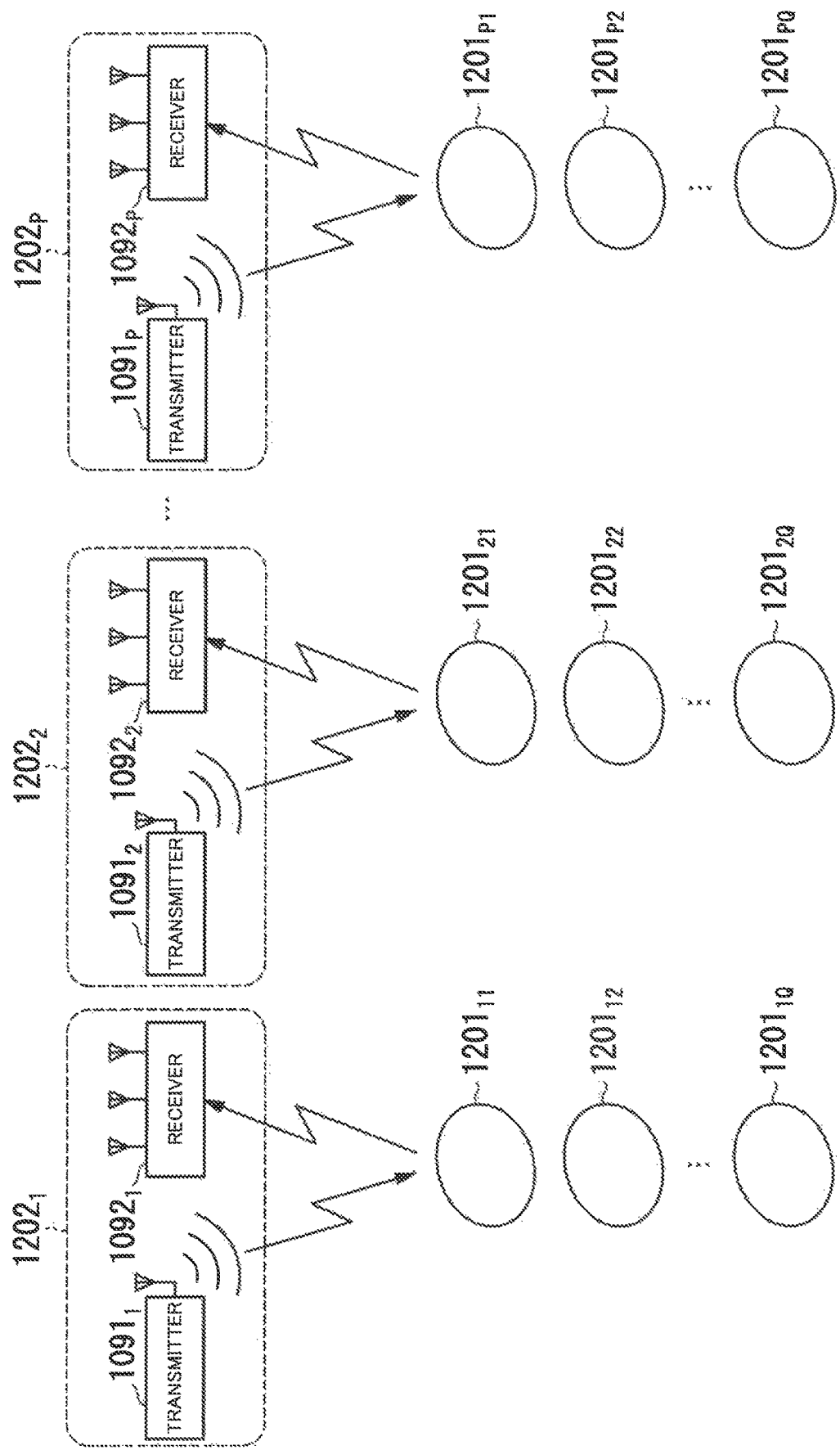
FIG. 15 is a configuration diagram illustrating a configuration of a fourth example embodiment of the present invention.

FIG. 15 is a configuration diagram illustrating a configuration of a fourth example embodiment of the present invention. In the fourth example embodiment of the present invention, it is assumed that an object sensing device $1202_p$ (where p=1, 2, ..., and P) constituted by a transmitter $1091_p$ and a receiver $1092_p$ is provided. P is the number of object sensing devices 1202. The object sensing device $1202_p$ constituted by a transmitter $1091_p$ and a receiver $1092_p$, detects states of target objects $1201_{p1}$, $1201_{p2}$, ..., and $1201_{pQ}$ by causing the transmitter $1091_p$ to irradiate a radio wave to the target objects $1201_{p1}$, $1201_{p2}$, ..., and $1201_{pQ}$, and causing the receiver $1092p$ to receive a reflected wave from the target objects $1201_{p1}$, $1201_{p2}$, ..., and $1201_{pQ}$. Herein, Q is the number of target objects 1201. Specifically, when target objects $1201_{p1}$, $1201_{p2}$, ..., and $1201_{pQ}$ are persons, presence of an article under clothes may be detected by transmitting a radio wave through the clothes worn by the persons ($1201_{p1}$, $1201_{p2}$, ..., and $1201_{pQ}$). Alternatively, when target objects $1201_{p1}$, $1201_{p2}$, ..., and $1201_{pQ}$ are objects (particularly, dielectric members), an inner structure of the objects ($1201_{p1}$, $1201_{p2}$, ..., and $1201_{pQ}$) may be detected by transmitting a radio wave through the inside of the objects ($1201_{p1}$, $1201_{p2}$, ..., and $1201_{pQ}$). The object sensing device $1202_p$ may detect states of the target objects $1201_{p1}$, $1201_{p2}$, ..., and $1201_{pQ}$ in an order by a workflow. Further, in FIG. 15, one object sensing device 1202 is allocated for detection or inspection of one target object 1201. Alternatively, a plurality of object sensing devices 1202 may be allocated for detection or inspection of one target object 1201. Further alternatively, one object sensing device 1202 may be allocated for detection or inspection of a plurality of target objects 1201.

In the present example embodiment, since the object sensing device 1202 is implemented with a compact size and at a low cost, it is easy to increase the number P of object sensing devices 1202. In the fourth example embodiment of the present invention illustrated in FIG. 15, it is possible to increase an inspection speed of target objects $1201_{p1}$, $1201_{p2}$, ..., and $1201_{pQ}$ (where p=1, 2, ..., and P) in proportion to the number P of object sensing devices 1202.

Figure 16:
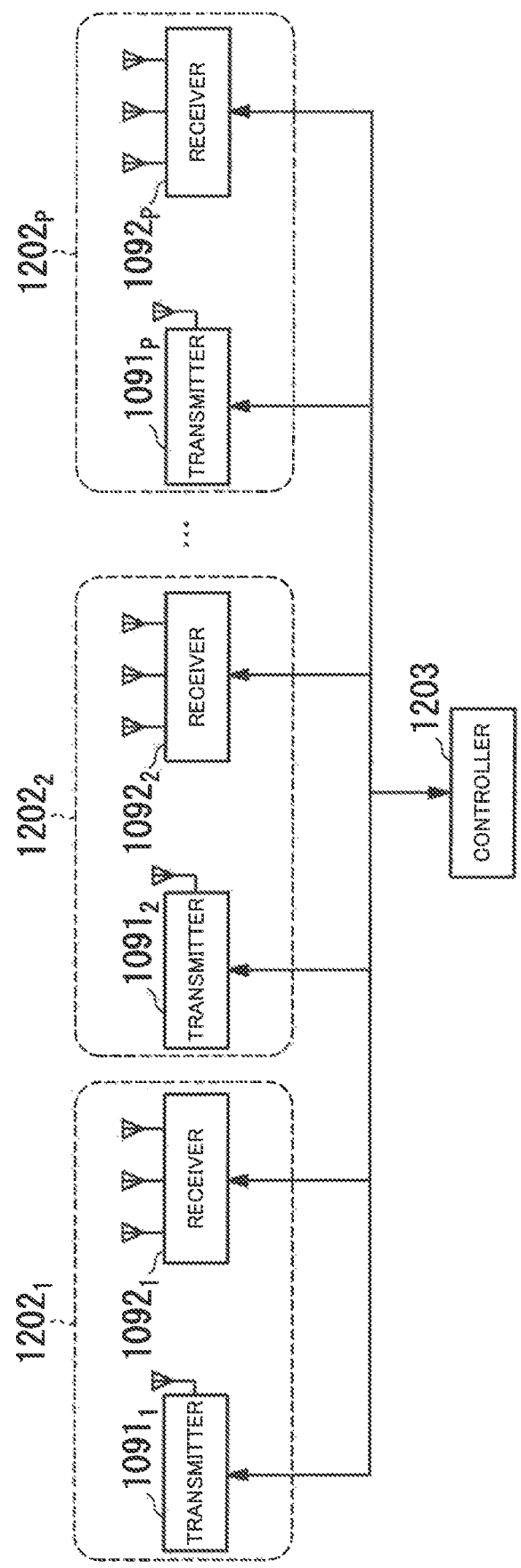
FIG. 16 is a configuration diagram illustrating a configuration of the fourth example embodiment of the present invention.

In the fourth example embodiment of the present invention illustrated in FIG. 15, an erroneous operation by interference between object sensing devices $1202_p$ (where p=1, 2, ..., and P) may cause a problem. Specifically, roundabout of a radio wave from a transmitter $1091_p$ to a receiver $1092_r$ (p≠r) becomes a factor of interference. FIG. 16 discloses a configuration and an operation for avoiding this problem. In FIG. 16, a controller 1203 is provided. The controller 1203 controls a transmitter $1091_p$ and a receiver $1092_p$ constituting an object sensing device $1202_p$ (where p=1, 2, ..., and P). Specifically, the controller 1203 performs control in such a way that a transmitting RF frequency of a transmitter $1091_p$ coincides with a receiving RF frequency of a receiver $1092_p$. As also described in the first example embodiment, this processing is performed by synchronously controlling an LO frequency to be output from the oscillator 1103 in the transmitter $1091_p$ and an LO frequency to be output from the oscillator 1101 in the receiver $1092_p$. It is assumed that an RF frequency of an object sensing device $1202_p$ (specifically, a transmitting RF frequency of a transmitter $1091_p$ and a receiving RF frequency of a receiver $1092_p$) is $f_p$. Further, the controller 1203 performs control in such a way that an RF frequency $f_p$ of the object sensing device $1202_p$ and an RF frequency $f_r$ of an object sensing device $1202_r$ become different values (p, r=1, 2, ..., and P, and p≠r). In this way, it is possible to prevent interference between the object sensing devices $1202_p$ and $1202_r$ (p≠r) by operating the object sensing devices $1202_p$ and $1202_r$ (p≠r) different from each other at different RF frequencies.

Figure 17:
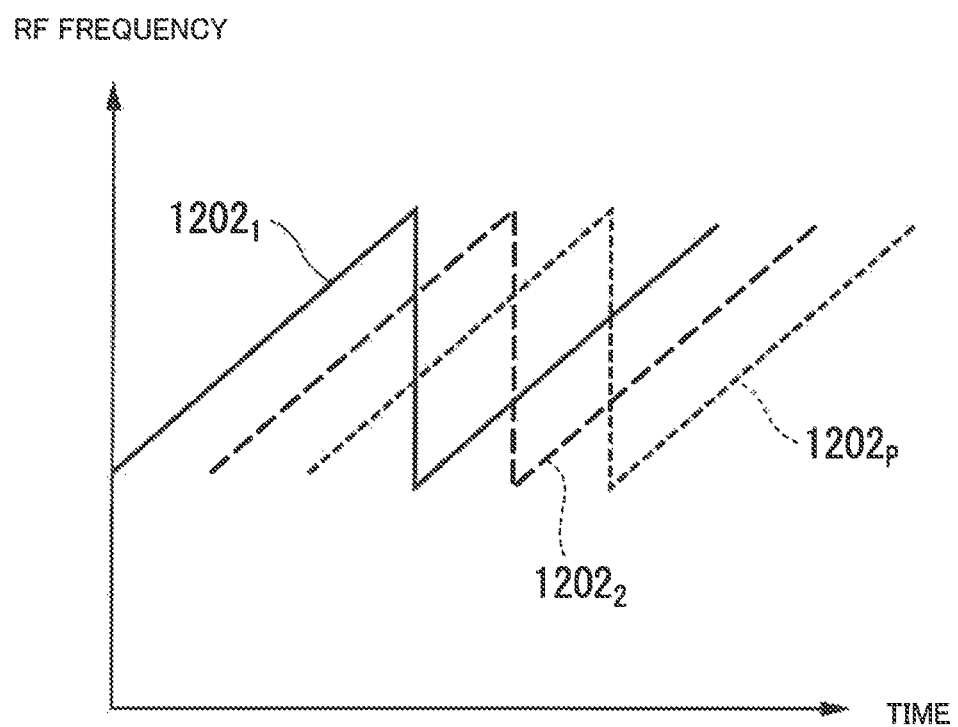
FIG. 17 is a diagram illustrating an example of control of an RF frequency of an object sensing device in the fourth example embodiment of the present invention.

FIG. 17 illustrates an example of control of an RF frequency of an object sensing device $1202_p$ (where p=1, 2, ..., and P). In FIG. 17, a time change of an RF frequency of the object sensing device $1202_p$ (where p=1, 2, ..., and P) is controlled in the form of a chirp. At this occasion, control is performed in such a way that different object sensing devices $1202_p$ and $1202_r$ (p≠r) are not operated at the same RF frequency by mutually displacing a time change of an RF frequency of the object sensing device $1202_p$ (where p=1, 2, ..., and P).

Figure 18:
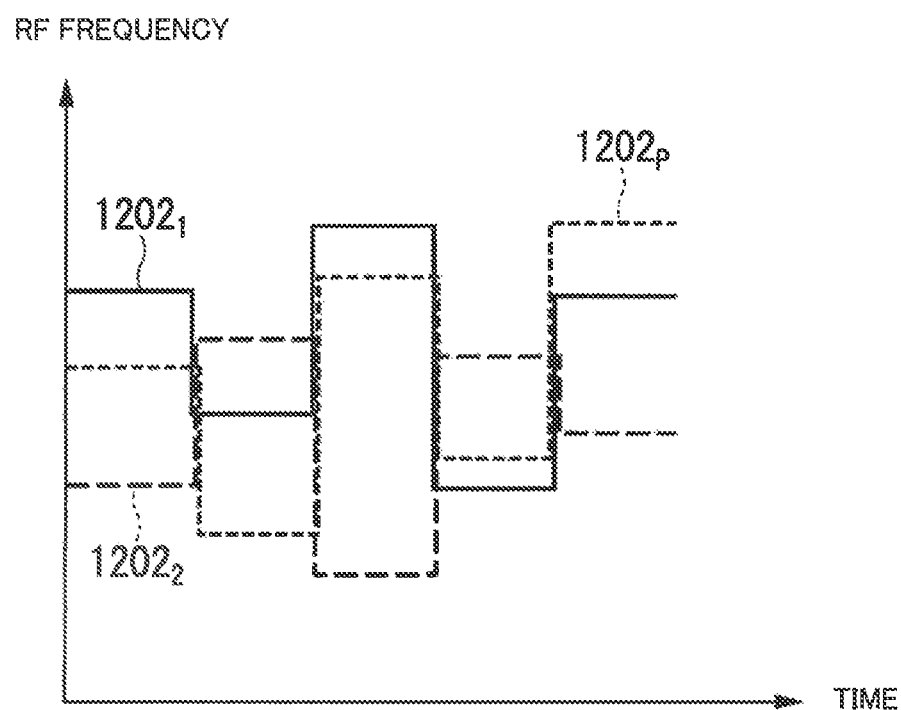
FIG. 18 is a diagram illustrating an example of control of an RF frequency of the object sensing device in the fourth example embodiment of the present invention.
Figure 19:
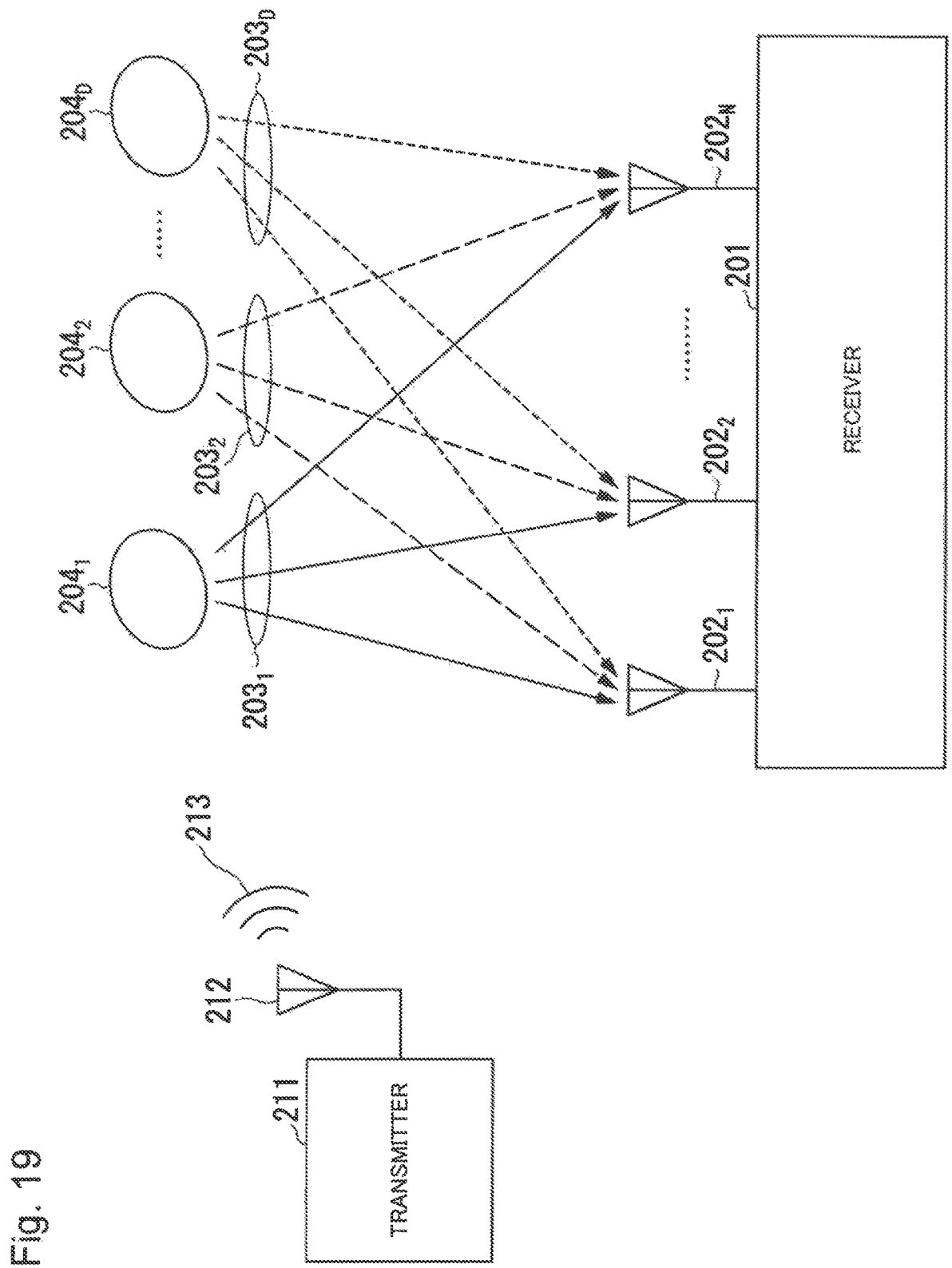
FIG. 19 is a conceptual diagram illustrating a concept on an array antenna method in a general technique.

Further, FIG. 18 illustrates an example of control of an RF frequency of the object sensing device $1202_p$ (where p=1, 2, ..., and P). In FIG. 18, control is performed in such a way that different object sensing devices $1202_p$ and $1202_r$ (p≠r) are not operated at the same RF frequency by performing a frequency hopping operation that an RF frequency of the object sensing device $1202_p$ (where p=1, 2, ..., and P) changes at a certain time interval.

In the following, advantageous effects of respective example embodiments of the present invention are summarized.

When compared to respective example embodiments, the array antenna method requires a large number of antennas. On the other hand, in the respective example embodiments, it is possible to increase the number of virtual antennas by increasing the number of frequencies, in place of increasing the number of actual antennas. Consequently, in the respective example embodiments, it is possible to implement a function equivalent to a function of a general array antenna method by at least one transmission antenna and one reception antenna per direction, and it is possible to remarkably reduce the number of actual antennas, as compared with a general array antenna method.

When compared to respective example embodiments, the synthetic aperture radar method requires the receiver 301 to be mechanically moved. This causes a problem that time for detecting or inspecting an object increases. On the other hand, in the respective example embodiments, not a position of a receiver but a receiving frequency is electronically scanned. Therefore, it is possible to shorten time for detecting or inspecting an object, as compared with a synthetic aperture radar method.

Specifically, in the above-described object sensing device and object sensing method, since it is possible to reduce the number of required antennas and receivers accompanied thereby, as compared with a general array antenna method, an advantageous effect that it is possible to reduce a cost, a size, and a weight of a device is provided. Further, in the above-described object sensing device and object sensing method, unlike a general synthetic aperture radar method, since it is not required to mechanically move a device, an advantageous effect that it is possible to shorten time for detecting or inspecting an object is provided.

Example embodiments of the present invention are directed to an object sensing device and an object sensing method for generating an image of an object to be detected by irradiating a radio wave of a plurality of RF frequencies to the object to be detected, and detecting a radio wave to be reflected or irradiated from a target object, and main features of the example embodiments are reducing the number of required antennas and receiving units, as compared with a general configuration, and implementing image generation by high-speed scanning without the need of moving.

Specifically, an object sensing device in the respective example embodiments of the present invention is an object sensing device constituted by a transmitter including a transmission antenna and a receiver including a reception antenna. A radio wave of a plurality of frequencies is irradiated from the transmission antenna toward a target object. The receiver receives the radio wave of a plurality of frequencies reflected from the target object. The receiver has a function of respectively adjusting phases with respect to the received radio wave of respective frequencies. The receiver controls directivity of antenna gain by the phase adjusting function, and the receiver detects a position or a shape of the target object by measuring an intensity distribution of a radio wave incoming to the receiver by directivity control of the antenna gain.

In the description above, the preferable example embodiments of the present invention are explained. However, the contents disclosed in the PTLs can be inserted with quotation to the corresponding description in the example embodiments. Among all the disclosure (including the claims) of the present invention or based on the fundamental technical ideas therein, the embodiments can be changed or adjusted. It is also possible that the disclosed elements can be combined each other or selected, in various manner. Accordingly, it is obvious that the present invention includes various changes or revisions that those of ordinary skill in the art may achieve based on all the disclosure including the claims or technical ideas therein.

This application is based upon and claims the benefit of priority from Japanese patent application No. 2016-050700 filed on Mar. 15, 2016, the disclosure of which is incorporated herein in its entirety by reference.

REFERENCE SIGNS LIST

1001, 1201 Target object
1002 Focal plane
1003 Transmission antenna
1004 Reception antenna
1007, 1010 Radio wave (RF signal)
1041 Low-noise amplifier
1042, 1072 Mixer
1043, 1045, 1073 Band-pass filter
1044 Analog-to-digital converter
1074 Digital-to-analog converter
1101, 1103 Oscillator
1102 Receiving control unit
1104 Transmitting control unit
1105 Output device
1106 Data processing unit
1091 Transmitter
1092 Receiver
1202 Object sensing device
1203 Controller

What is claimed is:

1. An object sensing device constituted of a transmitter including a transmission antenna, and a receiver including a reception antenna, wherein
the transmitter irradiates radio frequency (RF) signals of a plurality of frequencies from the transmission antenna toward a target object,
the receiver receives the RF signals of a plurality of the frequencies reflected from the target object,
the receiver has a phase adjusting equipment for adjusting phases of the received RF signals having respective frequencies, and
the receiver controls directivity of antenna gain by the phase adjusting function, and the receiver detects a position and a shape of the target object by measuring an intensity distribution of the RF signals incoming to the receiver by directivity control of the antenna gain, wherein
the transmitter further includes a transmitting controller, a digital-to-analog converter, a band-pass filter, a mixer, a local oscillation signal source, and a power amplifier,
the transmitting controller transmits a digital signal toward the digital-to-analog converter,
the digital-to-analog converter converts the digital signal to an analog IF signal, the analog IF signal is input to the mixer via the band-pass filter,
the local oscillation signal source inputs a local oscillation signal to the mixer,
the mixer frequency-converts the analog IF signal to the RF signal by the local oscillation signal, and outputs the RF signal,
the RF signal output from the mixer is transmitted from the transmission antenna after being amplified by the power amplifier,
the receiver further includes a receiving controller, an analog-to-digital converter, a second band-pass filter, a second mixer, a second local oscillation signal source, and a second amplifier,
the reception antenna receives the RF signal,
the second amplifier amplifies the RF signal received by the reception antenna, and outputs the amplified RF signal to the second mixer,
the second local oscillation signal source inputs the local oscillation signal to the second mixer,
the second mixer frequency-converts the RF signal to a second analog IF signal by the local oscillation signal, and outputs the analog IF signal,
the second analog-IF signal is input to the receiving controller and an analog-to-digital converter via the second band-pass filter,
the receiving controller and the analog-to-digital converter convert the second analog-IF signal to a second digital signal representing complex amplitudes of the RF signal, and inputs the digital signal to the receiving controller,
the receiving controller transfers the second digital signal to a data processor, and
the data processor performs processing of detecting a position or a shape of the target object, based on the second digital signal.

2. The object sensing device according to claim 1, wherein
the reception antenna is installed at least in one direction viewed from the transmission antenna, when a position coordinate of the target object is detected, a position coordinate value in a direction connecting the transmission antenna and the reception antenna is detected by using a signal received by the reception antenna, and a position and a shape of the target object are output from the position coordinate value.

3. The object sensing device according to claim 1, wherein
the reception antennas are installed at least in two directions viewed from the transmission antenna, when a position coordinate of the target object is detected, a position coordinate value parallel to a plane connecting the transmission antenna and the reception antennas is detected by using a product of signals received by the different reception antennas, and
a position and a shape of the target object are output as a two-dimensional image from the position coordinate value.

4. The object sensing device according to claim 1, wherein
the receiver selects received signals of at least the two frequencies from among a plurality of the frequencies of the RF signals, derives a correlation matrix of the selected signals, and derives a plurality of the correlation matrixes from a combination of different frequencies,
the receiver derives an average of the plurality of correlation matrixes,
the receiver calculates an evaluation function that reflects a position of the target object from the average correlation matrix, and
the receiver calculates a position of the target object from the evaluation function.

5. The object sensing device according to claim 1, wherein
the transmitter selects a number of the frequencies to be transmitted, depending on a ratio between a desired visible area and resolution, or a desired number of pixels.

6. The object sensing device according to claim 1, wherein
the receiver includes a variable filter, and
the receiver selects the frequency of the RF signal to be received, by the variable filter.

7. The object sensing device according to claim 1, wherein
each of the local oscillation signal sources and the second local oscillation signal source is a variable local oscillation signal source
capable of changing the local oscillation signal frequency of the local oscillation signal to be output, and
by synchronously changing a frequency of the local oscillation signal of the local oscillation signal sources and the second local oscillation signal source, the RF frequency of the RF signal to be transmitted from the transmitter, and the RF frequency of the RF signal receivable by the receiver are synchronized and are made equal to each other.

8. The object sensing device according to claim 7, wherein
a plurality of the transmitters and a plurality of the receivers are provided, at least one of the transmitters and at least one of the receivers are made to be a set, the transmitter and the receiver belonging to the same set are controlled to be operated at the same RF frequency, and the transmitter and the receiver belonging to different set are controlled to be operated at different RF frequencies.

* * * * *